US012667798B2

(12) United States Patent
Takano

(10) Patent No.: US 12,667,798 B2
(45) Date of Patent: Jun. 30, 2026

(54) RETAINER FOR FILTERS, AND LEAF DISC FILTER ELEMENT

(71) Applicant: FUJI FILTER MANUFACTURING CO., LTD., Tokyo (JP)

(72) Inventor: Toshiaki Takano, Tokyo (JP)

(73) Assignee: FUJI FILTER MANUFACTURING CO., LTD., Tokyo (JP)

( * ) Notice: Subject to any disclaimer, the term of this patent is extended or adjusted under 35 U.S.C. 154(b) by 597 days.

(21) Appl. No.: 18/003,090

(22) PCT Filed: Jun. 9, 2021

(86) PCT No.: PCT/JP2021/021891
§ 371 (c)(1),
(2) Date: Dec. 22, 2022

(87) PCT Pub. No.: WO2022/004315
PCT Pub. Date: Jan. 6, 2022

(65) Prior Publication Data
US 2023/0256365 A1     Aug. 17, 2023

(30) Foreign Application Priority Data

Jun. 29, 2020     (JP) ................................. 2020-111444

(51) Int. Cl.
B01D 29/39 (2006.01)
B01D 29/00 (2006.01)

(52) U.S. Cl.
CPC ......... B01D 29/39 (2013.01); B01D 29/0093 (2013.01); B01D 2201/0423 (2013.01)

(58) Field of Classification Search
CPC ................ B01D 29/39; B01D 29/0093; B01D 2201/0423; B29C 48/265; B29C 48/503; B29C 48/694
(Continued)

(56) References Cited

U.S. PATENT DOCUMENTS 3,702,659 A     11/1972  Clark
4,902,420 A     2/1990  Pall et al.
(Continued)

FOREIGN PATENT DOCUMENTS

EP     1398065 A2     3/2004
JP     47-32221 Y1     9/1972
(Continued)

OTHER PUBLICATIONS

WIPO, Japan International Search Authority, International Search Report (with English translation) and Written Opinion mailed Aug. 24, 2021 in International Patent Application No. PCT/JP2021/021891, 12 pages.

(Continued)

*Primary Examiner* — Hayden Brewster
(74) *Attorney, Agent, or Firm* — MASUVALLEY & PARTNERS; Peter Martinez

(57) ABSTRACT

The retainer includes a first metal plate member 10A or 40A in which flow-path forming members having a predetermined curved shape or a linear shape are arranged on the same plane in parallel to each other at a predetermined interval to form a donut shape as a hole, and a second metal plate member 10B or 40B having a configuration equivalent to that of the first metal plate member, wherein crossings of the flow-path forming members configuring the respective metal plate members are fixed with the second metal plate member stacked on the first metal plate member, and the flow-path forming members 15A or 50A configuring the first metal plate member and the flow-path forming members 15B or 50B configuring the second metal plate member form a line symmetric shape in plan view.

4 Claims, 16 Drawing Sheets

(58) Field of Classification Search
USPC .......................................................... 210/348
See application file for complete search history.

(56) References Cited

U.S. PATENT DOCUMENTS

| | | | |
|---|---|---|---|
| 5,100,551 | A | 3/1992 | Pall et al. |
| 5,611,925 | A | 3/1997 | Yasue et al. |
| 2011/0094959 | A1 | 4/2011 | Kurimoto et al. |

FOREIGN PATENT DOCUMENTS

| | | |
|---|---|---|
| JP | S58-137408 U | 9/1983 |
| JP | H06-98250 B2 | 12/1988 |
| JP | H08-33805 A | 2/1996 |
| JP | H10-337415 A | 12/1998 |
| JP | 2008-200607 A | 9/2008 |
| JP | 2009-279517 A | 12/2009 |
| JP | 2014-140793 A | 8/2014 |
| JP | 2016-185666 A | 10/2016 |
| KR | 10-2011-0020769 A | 3/2011 |

OTHER PUBLICATIONS

European Patent Office, Extended European search report dated Jun. 24, 2024 in European Patent Application No. 21833189.0, 9 pages.
Korean Intellectual Property Office, Office Action with English Translation dated Jul. 9, 2025 in Korean Patent Application No. 10-2023-7001927, 14 pages.

RETAINER FOR FILTERS, AND LEAF DISC FILTER ELEMENT

RELATED APPLICATIONS

This application is the U.S. National Phase of and claims priority to International Patent Application No. PCT/JP2021/021891, International Filing Date Jun. 9, 2021, entitled Retainer For Filters, Production Method Therefor, And Leaf Disc Filter Element; which claims benefit of Japanese Application No. JP2020-111444 filed Jun. 29, 2020 entitled Retainer For Filter, Manufacturing Method Of The Same, And Leaf Disk Filter Element; both of which are incorporated herein by reference in their entireties.

FIELD

The present invention relates to a retainer for filters, a manufacturing method therefor, and a leaf disc filter element.

BACKGROUND

An optical film used in a liquid crystal display or the like is manufactured by melt extrusion.

In melt extrusion, a thermoplastic resin, for example, polymer melted by an extruder is supplied to a filtration device, impurities are removed from the thermoplastic resin in the filtration device, and the thermoplastic resin is then extruded from a discharge port to be molded in the form of a film.

In the melted resin extruded from the extruder, foreign substances not sufficiently melted, burnt foreign substances that have been burned and solidified, or other foreign substances may be left or mixed. Therefore, it is necessary to remove impurities by filtration. A known example of such a filtration device is a leaf disc filter device.

A leaf disc filter device of Patent Literature 1 includes a donut-shaped filter element as a filter for polymer filtration or filtration of a viscous fluid. This filter element includes a donut-shaped retainer formed by wire netting or the like for supporting a filter medium and a disc-shaped filter medium arranged on each surface of the retainer via a porous support plate (for example, a punching metal) and formed by sintered metal fibers or the like. The filter elements are stacked around a polymer discharge pipe (a center pole) with a polymer introduction hole on its outer circumferential surface by using hub rings at the center, thereby forming the leaf disc filter device.

The filter elements are sealed in a housing into which a melted resin is supplied with a relatively high pressure. After the melted resin that has entered between the stacked filter elements passes through the filter media and is filtered, the melted resin reaches the retainer through the porous support plate, and flows in voids of wire netting forming the retainer inward in the radial direction to be collected at the center or the like of the stacked filter elements. The filtered fluid is then sent to a predetermined destination via the polymer discharge pipe.

When the pressure loss in the leaf disc filter element is high, the flow speed of the melted resin passing through the filter element becomes non-uniform which may cause the melted resin to stay. Therefore, reduction of the pressure loss is an important factor affecting the product quality.

In passing resistance as a factor causing the pressure loss in the leaf disc filter element, filtration resistance of the filter medium and resistance until the melted resin that has passed through the filter medium flows through the porous support plate, flows in the retainer inward in the radial direction, and reaches the hub ring are large. In particular, in a retainer formed by wire netting, flow paths form non-linear, complicated, and narrow routes, and the resistance of the individual flow paths frequently vary. Therefore, there is a limit on reduction of a pressure drop in the retainer, and staying in the retainer can easily occur.

Patent Literature 2 discloses, as a retainer for leaf disc filter devices including a configuration other than wire netting, a configuration in which a pair of etched discs with a number of through holes formed by chemical etching and arranged in the circumferential direction are joined to each other while the positions of the corresponding through holes are made coincident with each other, and an internal passage extending in the radial direction is formed between the etched discs.

However, since the retainer is configured by the two etched discs, there is a problem that the number of parts is increased and the thickness is increased. Further, the thickness dimension of the internal passage formed between the two etched discs is reduced, which causes increase of the passing resistance. Furthermore, an annular region located between the through holes and formed by half etching also causes reduction of the quality because of increase of the passing resistance and a non-uniform staying time.

Patent Literature 3 discloses a support plate for filters (a retainer) in which a plurality of annular arrays of cuts or elongate holes are concentrically arranged in a disk-shaped flat plate member in the radial direction of the disc-shaped flat plate member, the positions of portions between the cuts or the elongate holes are shifted in the circumferential direction of the disk-shaped flat plate member, and the portions between the cuts or the elongate holes are bent up and down alternately, whereby standing portions protruding up or down are formed by a substantially 90-degree twist with respect to the plate surface. However, the standing portions located on the outermost circumference cannot be arranged to extend to the outer circumferential edge of the disk-shaped flat plate member. Therefore, a melted resin that has passed through the outermost circumferential portion of a filter medium and has entered into the disk-shaped flat plate member can easily stay at the outermost circumferential edge (a plate surface portion) of the disk-shaped flat plate member. Further, a plate-shaped portion of the flat plate member remains between the standing portions, and therefore serves as resistance against a flow of the melted resin.

Patent Literature 4 also discloses a configuration in which grooves extending in the radial direction are formed on a support and discharge board as a retainer formed by a single metal plate. However, these grooves are terminated before the outermost circumferential edge of the support and discharge board, and therefore a melted resin that has passed through a filtering medium stays in a portion where no groove is present. Further, a plate-shaped portion in which the grooves are not formed serves as the resistance against a flow of the melted resin.

These disadvantages occur not only in an optical film or an optical sheet but also when a resin molded product is manufactured, regardless of use and shape.

CITATION LIST

Patent Literatures

Patent Literature 1: Japanese Patent Application Laid-open No. 2016-185666

Patent Literature 2: Japanese Patent Application Laid-open No. 2009-279517

Patent Literature 3: Japanese Patent Application Laid-open No. H10-337415

Patent Literature 4: Japanese Patent Publication No. H6-98250

SUMMARY

Technical Problem

The present invention has been achieved in view of the above problems, and provides a retainer for filters, a manufacturing method therefor, and a leaf disc filter element that can provide effects of low pressure loss, high strength, and high pressure resistance.

Solution to Problem

In order to solve the above problems, a retainer for filters according to the present invention includes a first metal plate member in which a plurality of flow-path forming members having a predetermined curved shape or a linear shape in plan view are arranged on the same plane in parallel to each other with a predetermined interval form a donut shape as a whole and a second metal plate member having a configuration equivalent to that of the first metal plate member, wherein crossings of the flow-path forming members configuring the respective metal plate members are fixed while one surface of the second metal plate member is stacked on one surface of the first metal plate member, and the flow-path forming members configuring the first metal plate member and the flow-path forming members configuring the second metal plate member form a line symmetric shape in plan view.

Advantageous Effects of Invention

According to the present invention, effects of low pressure loss, high strength, and high pressure resistance can be provided.

DESCRIPTION OF EMBODIMENTS

Figures 1A, 1B:
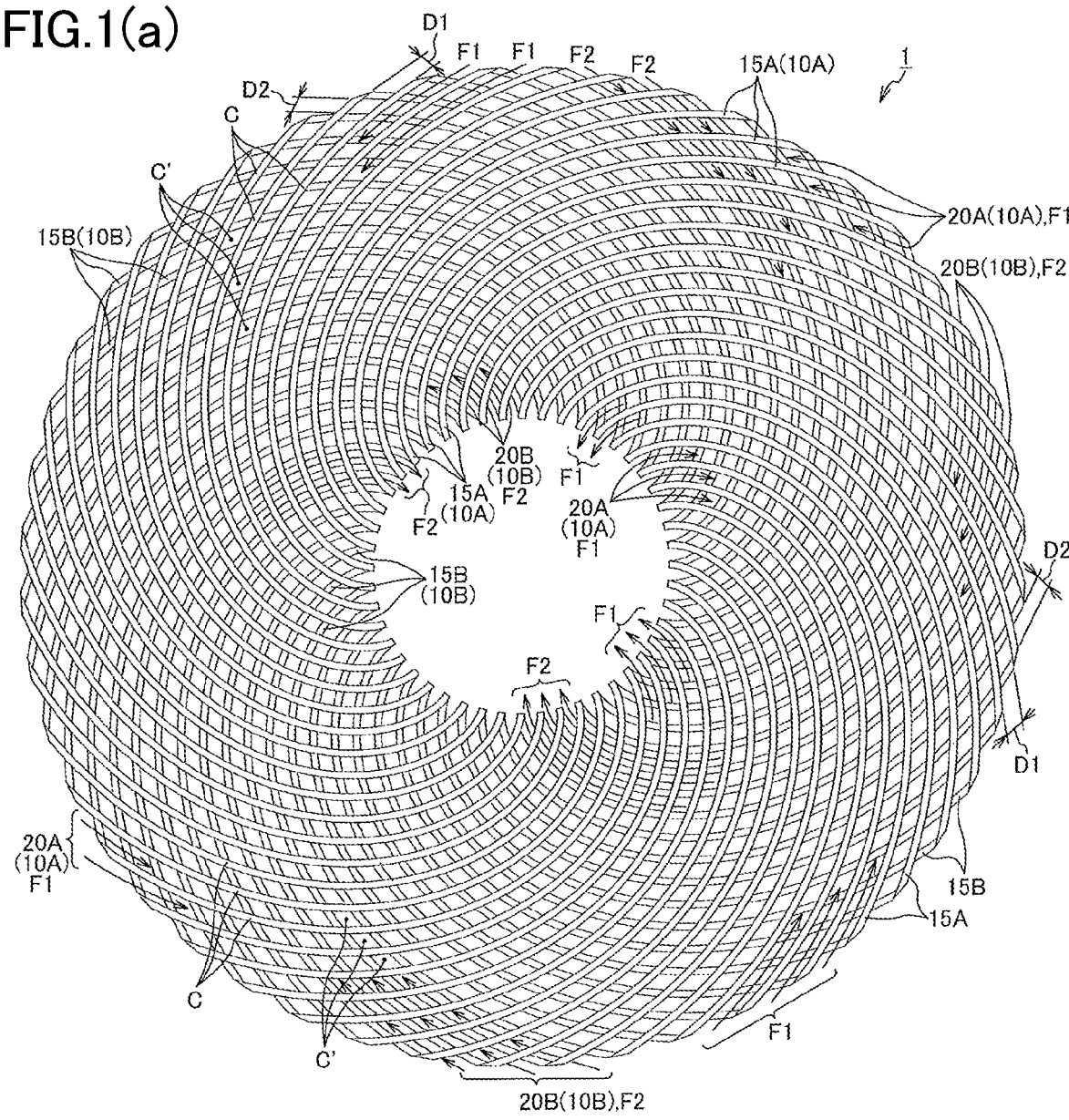
FIGS. 1(a) and (b) are a plan view and a front view illustrating an overall configuration of a retainer for filters according to a first embodiment of the present invention.

The present invention will be explained below in detail by embodiments illustrated in the drawings.

First Embodiment

<Basic Configuration>

Figure 2A:
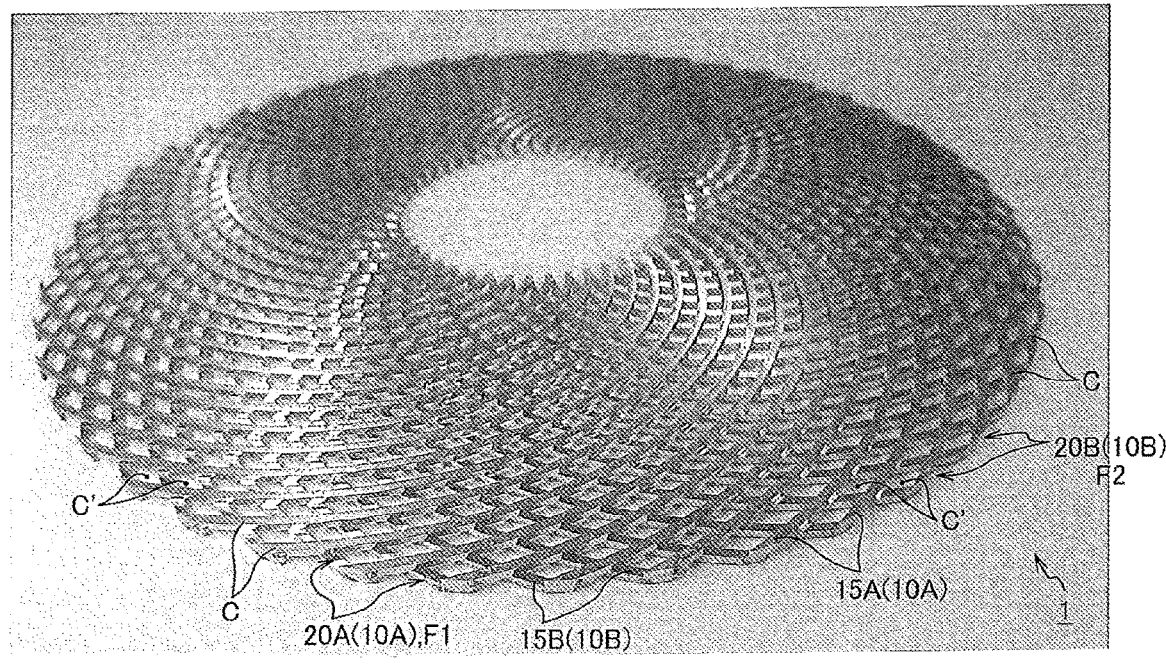
FIGS. 2(a) and (b) are a perspective view (a photograph) illustrating the overall configuration of the retainer for filters and an enlarged plan view (a photograph) of a main portion.
Figure 3:
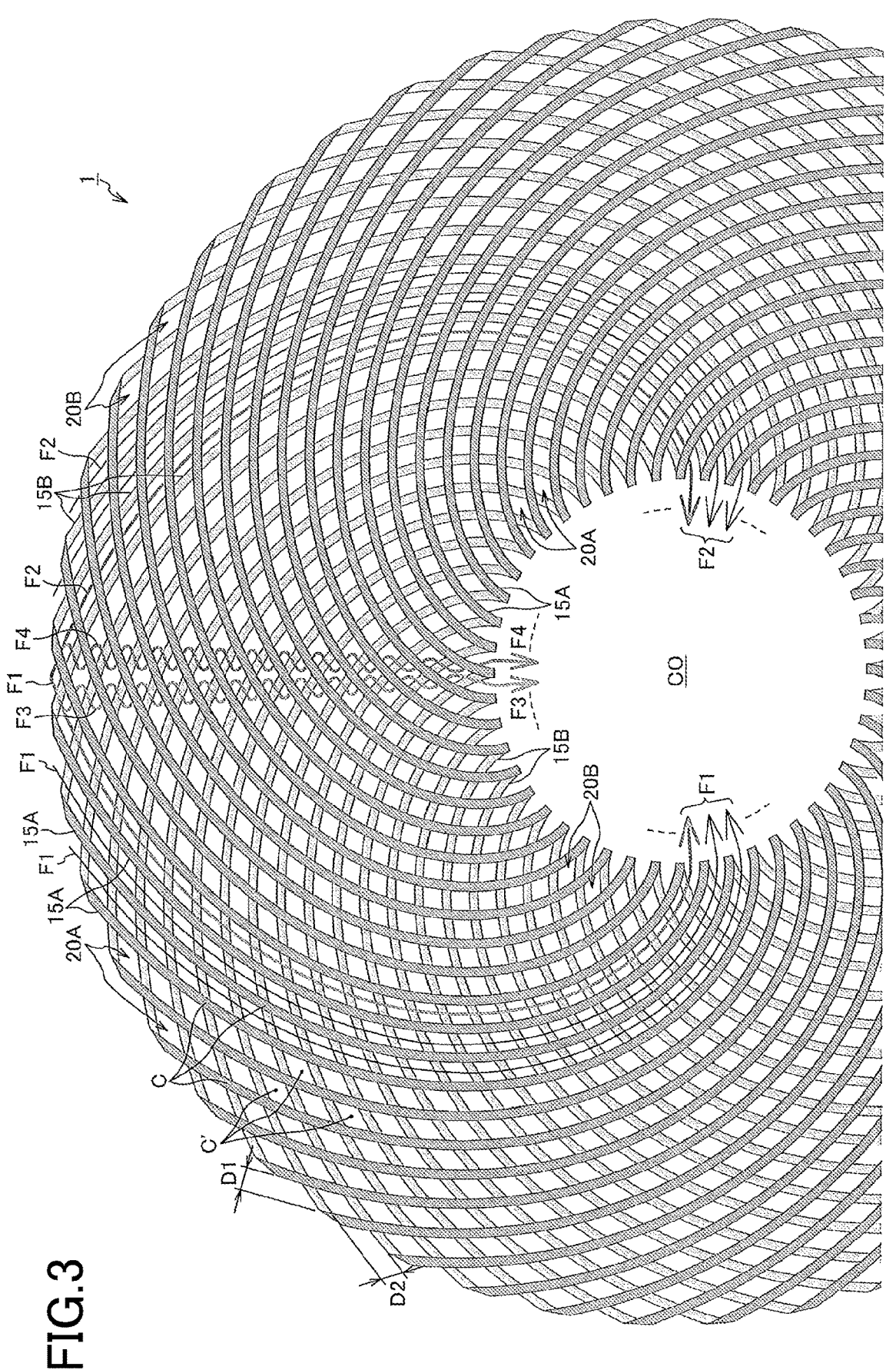
FIG. 3 is an explanatory diagram illustrating main flow paths formed in the retainer for filters.

FIGS. 1(a) and (b) are a plan view and a front view illustrating an overall configuration of a retainer for filters according to a first embodiment of the present invention, FIGS. 2(a) and (b) are a perspective view (a photograph) illustrating the overall configuration of the retainer for filters and an enlarged plan view (a photograph) of a main portion, and FIG. 3 is an explanatory diagram illustrating main flow paths formed in the retainer for filters.

A retainer for filters according to the present example (hereinafter, "retainer") 1 is arranged between two filter media 108 in a leaf disc filter element 100 illustrated in FIGS. 15 and 16 and is used as means for supporting the filter media. The retainer 1 has a configuration including a first metal plate member 10A and a second metal plate member 10B that are stainless (SUS304) plates with a thickness of 1.5 to 2 mm, for example, in each of which a number of curved slits (gaps) 20A or 20B are formed in parallel to each other at a regular interval in the form of a spiral, both the metal plate members being stacked and integrated with each other by sintering.

Each of the metal plate members 10A and 10B can be manufactured by forming the slits 20A or 20B in a donut-shaped flat plate made of, for example, stainless by laser processing. Further, the retainer 1 includes the two metal plate members 10A and 10B that are configured by a plurality of flow-path forming members 15A and 15B, which are, for example, rod members (or wire rods) in the present embodiment, equally spaced via the slits 20A and 20B and having a shape of an involute curve, the two metal plate members 10A and 10B being integrated with each other by sintering (fixing) crossings of the rod members 15A and 15B while respective surfaces of the two metal plate members 10A and 10B are stacked. Because of the shape of an involute curve of the rod members 15A and 15B, the slits 20A and 20B formed between the rod members also have the shape of an involute curve (a spiral shape).

The rod members (the flow-path forming members, skeleton members) 15A and 15B cross each other to form the skeleton of the retainer 1. The rod member (the flow-path forming member) 15A or 15B means an elongated member in the form of a narrow-width strip in plan view regardless of its vertical cross-sectional shape, and widely encompasses a member having a curved plane shape. The spiral-shaped slits 20A and 20B formed between the rod members are elongated gaps forming flow paths F1 and F2 described later. In the present embodiment, the rod members 15A form a curved grid curved in the clockwise direction from the inner side to the outer side in the radial direction, whereas the rod members 15B are a curved grid curved in the counterclockwise direction from the inner side to the outer side in the radial direction.

Because of the shape of an involute curve of the rod members 15A or 15B in plan view, the width of the slits 20A or 20B formed between the rod members can be made uniform over the entire length. By adjusting or changing the pattern of the shape of an involute curve, the widths at positions in the longitudinal direction (in the radial direction) in the individual slit can be also made different from each other. For example, the width of the slit on the inner side in the radial direction can be adjusted to be tapered, that is, become wider (gradually increase) or become narrower (gradually decrease) than on the outer side in the radial direction. Accordingly, the flow resistance in the slit against a melted resin can be reduced.

The retainer 1 includes the first metal plate member 10A in which the rod members (or the wire rods) 15A as a plurality of flow-path forming members having a predetermined curved shape in plan view, for example, a shape of an involute curve in the present example are arranged on the same plane at an even interval via the slits 20A to form a donut shape as a whole, and the second metal plate member 10B in which the rod members (or the wire rods) 15B having a shape of an involute curve in plan view are arranged on the same plane at an even interval via the slits 20B to form a donut shape as a whole, both the metal plate members being stacked and integrated with each other. Since the first metal plate member 10A and the second metal plate member 10B have the same shape as each other, they do not have to be manufactured by a special method and are suitable for mass production. Each spiral slit 20A or 20B is a plane curve that becomes farther from the center as the curve progresses.

When the second metal plate member 10B is stacked on the first metal plate member 10A, they are stacked (joined to each other) with a back surface 10B" of the second metal plate member 10B opposed to a back surface 10A" of the first metal plate member 10A as illustrated in FIG. 1(b). In other words, the retainer 1 is fixed with a front surface 10A' of the first metal plate member 10A and a front surface 10B' of the second metal plate member 10B facing outside. Therefore, the rod members 15A configuring the first metal plate member 10A and the rod members 15B configuring the second metal plate member 10B constitute a curved lattice (wire netting) that is line symmetric in plan view.

There are various methods of manufacturing each of the metal plate members 10A and 10B by forming the slits 20A or 20B in a metal material in the form of a flat plate by laser processing. An example of the manufacturing method is laser processing using a metal material processed in advance to have a donut shape. In this case, the slits are formed not to penetrate (not to be opened) to an inner circumferential edge (an inner radial portion) and an outer circumferential edge (an outer radial portion) of the metal material with a shape having a concentric center opening CO at the center of a disc (a donut shape). Each slit is terminated before the inner circumferential edge and the outer circumferential edge. That is, coupling is maintained between the inner ends in the radial direction of the rod members 15A, between the outer ends in the radial direction of the rod members 15A, between the inner ends in the radial direction of the rod members 15B, and between the outer ends in the radial direction of the rod members 15B so as to prevent the rod members from being disassembled. After the two metal materials coupled to each other in the inner circumferential edge and the outer circumferential edge are stacked and are sintered to be fixed at crossings of the rod members, the coupled ends of the rod members in the inner circumferential edge and the outer circumferential edge are cut and removed, whereby the rod members are made uncoupled. In this manner, a configuration in which the slits penetrate (are opened) to the inner radial portion (the center opening CO) and the outer radial portion is obtained. Since the rod members 15A and 15B configuring the two metal materials are sintered at each crossing, shape retention can be ensured, and the rod members are not disassembled even by removal of the ends of the rod members. Further, load applied to the retainer 1 when the retainer 1 is assembled into a leaf disc filter element can be received by each rod member, more particularly, by crossings C between the rod members as load receiving portions. Therefore, the strength and the shape retention can be maintained. The interval between the adjacent crossings C may vary depending on the distance from the center of the retainer, as is apparent from FIG. 1(a) and the like. However, this fact does not provide any disadvantage, for example, does not adversely affect the flow resistance in a flow path formed in each slit.

Alternatively, the slits and the rod members can be formed by laser processing in a metal flat plate not processed to have a donut shape. Such a manufacturing method will be described later.

Although the rod members 15A configuring the first metal plate member 10A have the same shape as each other and have the same cross-sectional shape (a rectangle) over the entire length in this example, this configuration is merely an example. The cross-sectional shape at different positions in the longitudinal direction may be different from each other. This description can be also applied to the rod members 15B configuring the second metal plate member 10B.

The sizes and the shapes (intervals) of the slits 20A and 20B respectively configuring the metal plate members 10A and 10B do not have to be exactly the same. An error or a deformation in micrometers or millimeters can be allowed. Further, the slits may be configured to have widths gradually decreasing or increasing along the longitudinal direction (the inner or outer radial direction) as described above.

The filter medium 108 is formed by stainless in the form of nonwoven fabric or felt-like stainless. Therefore, the strength and the hardness are low. In addition, since the retainer has an uneven surface, a porous support plate (for example, a punching plate) 106 obtained by perforating a flat plate at a predetermined pitch is interposed between the retainer and the filter medium in order to retain the sheet-like filter medium while maintaining a predetermined form of the filter medium.

The retainer 1 is required to have the strength for stably supporting the filter medium and the strength not to be crushed or deformed by pressure. At the same time, the retainer 1 has to have a low-resistance flow path formed therein which allows a melted resin passing through the filter medium to move inward in the radial direction with small pressure loss.

In the retainer according to the present embodiment, the rod members 15A configuring one metal plate member 10A form curved first flow paths F1 configured by the slits 20A that extend from the outer circumferential edge to the inner circumferential edge at a regular interval. The rod members 15B configuring the other metal plate member 10B form curved second flow paths F2 configured by the slits 20B that extend from the outer circumferential edge to the inner circumferential edge at a regular interval. The first flow paths F1 and the second flow paths F2 cross each other to form a line symmetric shape in plan view and communicate with each other in the thickness direction at flow-path crossings C' of the slits (the flow paths F1 and F2). Therefore, as illustrated in FIG. 3, in addition to the main flow paths F1 and F2 in the respective metal plate members 10A and 10B, other main flow paths F3 and F4 are formed which allow the flow paths F1 and F2 communicate with each other via the flow-path crossings C'. That is, flows with little vertical movement along the spiral flow paths F1 and F2 and the zigzag flow paths F3 and F4 that meander through the flow paths F1 and F2 are formed in a complex manner. The flow paths F3 and F4 represent the shortest routes from the outer radial portion to the inner radial portion. A melted resin can smoothly flow to the center opening CO while changing its flowing direction (meandering) vertically in a zigzag manner at the flow-path crossings C'. The cross-sectional area of the flow path at the flow-path crossing C' is not narrow as compared with the cross-sectional area of the flow path F1 or F2. Therefore, increase of the flow resistance, which causes large reduction of the flow speed, does not occur in this portion.

The flow paths F1, F2, F3, and F4 are continuously formed around the enter circumference (over the entire length in the circumferential direction) of the retainer 1, and the flow speed and the flow amount in the individual flow paths F1, F2, F3, or F4 are constant regardless of the difference between positions in the circumferential direction in each flow path. For example, the flow speed and the flow amount in the individual flow paths F1 do not vary depending on the position in the circumferential direction in each flow path F1, but are constant. That is, even when the flow speeds and the flow amounts in the respective flow paths F1 and F2 are different from the flow speeds and the flow amounts in the respective flow paths F3 and F4, the flow speed and the flow amount in all the flow paths F1 or F2 are constant. As for the flow speed and the flow amount in the other flow paths F3 and F4, the flow speed and the flow amount in the respective flow paths F3 and F4 are constant regardless of the difference between positions in the circumferential direction.

Meanwhile, in a conventional wire-netting retainer (a mesh retainer), the flow speed and the flow amount of a melted resin are not uniform and largely vary depending on the position in the circumferential direction in a flow path. Therefore, the melted resin is caused to stay, so that the product quality is difficult to maintain.

The main flow paths F1 to F4 illustrated in FIG. 3 are merely an example for simplifying the descriptions. Actually, complicated flows of the melted resin are formed by flow paths combined in a complex manner.

Next, a wide value and a narrow value in design of widths D1 and D2 of the respective slits 20A and 20B are determined in accordance with a pressure of a melted resin in a leaf disc filer device to which the retainer is applied. In a case where the widths D1 and D2 of the respective slits 20A and 20B are too wide, when the porous support plates 106 are supported by the rod members 15A and the rod members 15B, a portion of the porous support plate located between the rod members easily drops into the slits because of the pressure from the melted resin, to be curved and deformed. When each portion of the porous support plate is curved and deformed, the filter medium 108 supported by the porous support plate follows that curved deformation to be curved and deformed, so that it is difficult to maintain the posture required for maintaining an appropriate filtration performance, and deterioration of the filtration performance is caused.

In a case where the widths D1 and D2 of the respective slits 20A and 20B are too narrow, there is a disadvantage of increase of resistance in the retainer against a flow of a melted resin that has entered into the retainer through the porous support plate.

That is, both the resistance against the melted resin as a fluid to be filtered and a posture-maintaining performance of the porous support plate can be achieved in an appropriate manner by appropriate setting of the interval D1 between the adjacent rod members 15A and the interval D2 between the adjacent rod members 15B. According to the configuration of the present invention, the widths D1 and D2 of the slits 20A and 20B configuring the respective metal plate members 10A and 10B (that is, the intervals D1 and D2 between the rod members) can be formed with high dimension accuracy and be arranged regularly. Therefore, the widths D1 and D2 can be maintained to be constant.

Since the metal plate members 10A and 10B can be manufactured by processing a raw material in the form of a flat plate by laser processing, the dimension accuracy can be ensured. In addition, by forming the metal plate members 10A and 10B from metal with high strength, such as stainless, the strength of the rod members (the thickness and the shape) can be set so as not to allow the rod members to be crushed and deformed even under a high pressure. Accordingly, the widths D1 and D2 of the respective slits 20A and 20B can be maintained to be optimum, and the passing resistance of a melted resin can be maintained to be constant at a low value. Since the metal pleftlate members have the same shape as each other, they are suitable for mass production.

The manufacturing method using a metal plate as a raw material and performing laser processing is merely an example and manufacturing by casting or stamping or using a 3D printer or the like is also possible.

By applying the retainer 1 according to the present embodiment to a leaf disc filter element, the second flow paths F2 are formed in the metal plate member 10B on the back surface side in addition to the first flow paths F1 formed in the metal plate member 10A on the front surface side, while the first and second flow paths are shifted from each other to be line symmetric.

Figure 2B:
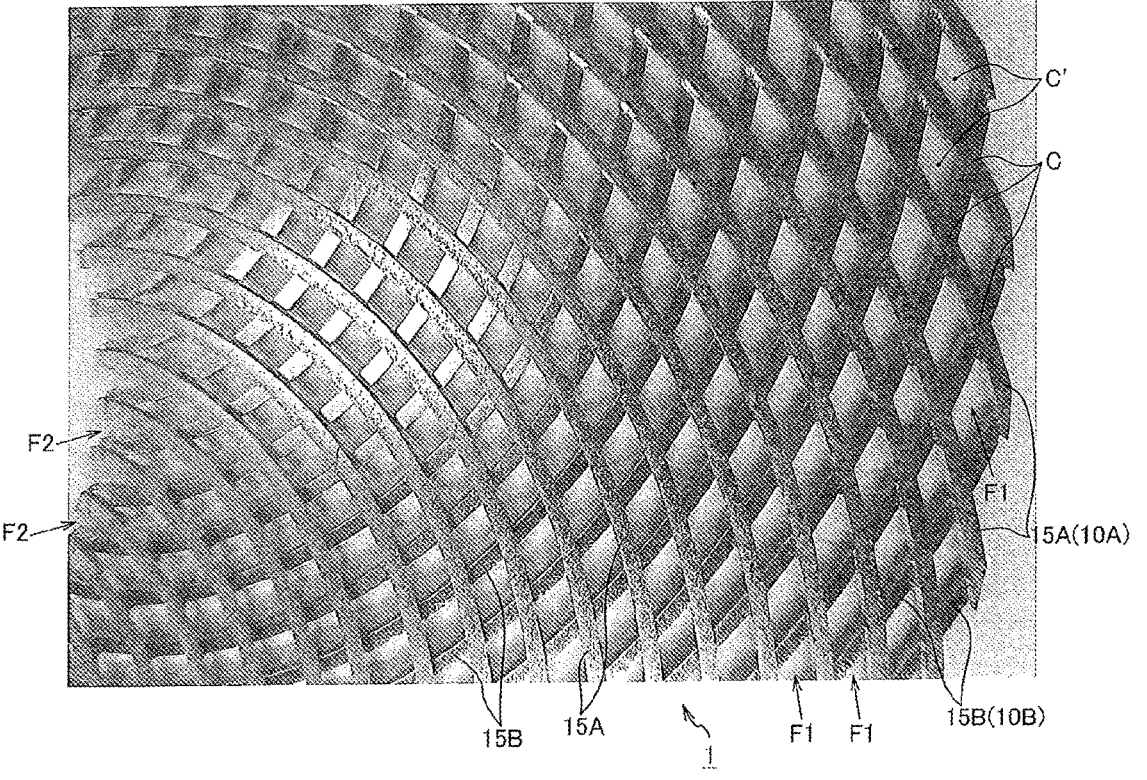

In FIGS. 1 and 2, the first flow paths F1 are curved (spiral) flow paths that are curved in the counterclockwise direction from the outer side to the inner side in the radial direction, and the second flow paths F2 are curved (spiral) flow paths that are curved in the clockwise direction from the outer side to the inner side in the radial direction.

The flow paths F1 and F2 are formed to be curved along the upper side and the lower side of a boundary surface between the two metal plate members 10A and 10B, respectively, with a uniform width and a uniform height. That is, the individual flow paths F1 or F2 are located at the same heights as each other. In the flow paths F1 and F2, there is neither an obstacle nor a route running zigzag in the vertical direction or the horizontal direction. Therefore, the resistance when a melted resin passes can be reduced, and pressure loss can be reduced. Accordingly, the flow speed of the melted resin is prevented from becoming non-uniform, and staying of the melted resin caused by the non-uniformity is also prevented, whereby the product quality can be maintained.

That is, since each of the flow paths F1 and F2 is a route (a flow path) that is less displaced in the vertical direction and has a shape of a gentle curve with a uniform width over the entire length or a gently tapered shape, the passing resistance of the melted resin can be largely reduced.

It is apparent that there is almost no obstacle in the flow paths F1 or F2 and that a route with a uniform width and a determined path is formed. That is, according to the present invention, the flow paths F1 and F2 not having variation in the routes and extending toward the inner radial portion are formed, whereby directionality of flow paths of a melted resin can be improved, and the melted resin is allowed to efficiently flow to the inner radial portion by the flow paths F1 and F2 and to a discharge pipe located in the inner radial portion.

In more detail, the first and second flow paths F1 and F2 form flow paths with few obstacles therein which penetrate in a curved manner from the outermost circumferential edge to the innermost circumferential edge of the donut-shaped retainer 1, as is apparent from FIGS. 1 and 2. Therefore, a melted resin that has entered into the first and second flow paths F1 and F2 through filter media can be made to efficiently flow to a discharge pipe located in the inner radial portion. In particular, the melted resin that has entered into the outermost circumferential edge of the retainer 1 and that can easily stay therein can be also made to flow to the inner radial portion in a stable manner. This point is a remarkable difference from Cited Literatures 3 and 4 that have a problem of a melted resin staying in an outer circumferential edge of a retainer.

Further, since the flow paths F1 and F2 in a vertical positional relation with each other communicate with each other via the flow-path crossings C' of the slits, the melted resins can mutually flow between the flow paths to be mixed. That is, since the zigzag flow paths F3 and F4 illustrated in FIG. 3 are formed in addition to the flow paths F1 and F2, the melted resins that have passed through the upper and lower filter media can be mixed with each other via the flow-path crossings C', so that variation in the quality of the melted resin caused by variation in the filtering capacity of the filter medium can be eliminated in the retainer.

Although only the shortest routes extending in the radial direction are illustrated as the zigzag flow paths F3 and F4 in addition to the flow paths F1 and F2 in FIG. 3, other zigzag flow paths extending from the outer side to the inner side in the radial direction at various angles (in directions other than the radial direction) can be formed.

In a leaf disc filter element, it is necessary to ensure flows of melted resin in the radial direction between filter media (in the retainer portion) and other directions toward the inner radial portion. In a retainer formed by wire netting, however, the flow direction can easily vary largely in the vertical direction or the horizontal direction, other than the directions toward the inner radial portion. In contrast, in the present embodiment, the flow directions can be made to concentrate on the directions toward the inner radial portion.

In particular, in a case of filtration of a high-viscosity fluid such as melted polymer, a retainer arranged in a passage of a melted resin is required to have various performances, for example, low pressure loss, high pressure resistance, and high bending strength because the pressure loss in a filter medium portion is large and a pressure difference between before and after the filter medium is also large. The retainer 1 having a simple shape can satisfy these requirements (low pressure loss, high pressure resistance, and high bending strength) sufficiently because there is almost no portion serving as an obstacle against the melted resin in each flow path F1 or F2. Also regarding the zigzag flow paths F3 and F4, the flow resistance at the flow-path crossing C' is negligibly small, and therefore flow paths can be formed to follow the shortest routes in the radial direction via the flow paths F1 and F2.

In a case of a retainer formed by wire netting or the like, it cannot be expected that the retainer itself has a strength for retaining a filter medium, and therefore most of the required strength for retaining the filter medium depends mainly on a porous support plate. In contrast, the retainer 1 of the present invention has a high mechanical strength. Therefore, only by maintaining the widths D1 and D2 of the respective slits 20A and 20B to appropriate values, the strength of the retainer for retaining the filter medium can be increased, and the degree of dependence on the porous support plate can be reduced. As a result, the porous support plate can be made thinner or be omitted. Accordingly, the thickness of a whole leaf disc filter device (a whole leaf disc filter element) can be reduced, allowing increase of the number of incorporated filter elements and increase of the filtration area.

Since the cross-sectional shape of each rod member (wire rod) according to the present example is rectangular, the surface of the rod member in which each metal plate member 10A or 10B faces the filter medium is flat. The porous support plate can be thus supported stably by this flat surface.

Although the rod members 15A or 15B are formed to have a shape of involute curve in the retainer according to the present embodiment, this shape is merely an example. It suffices that the rod members have an arc shape or a shape of another spiral curve. Therefore, the shape of the other spiral curve also widely includes the shape of a logarithmic spiral and the shape of an algebraic spiral.

<Manufacturing Method of Retainer According to First Embodiment>

Figure 4:
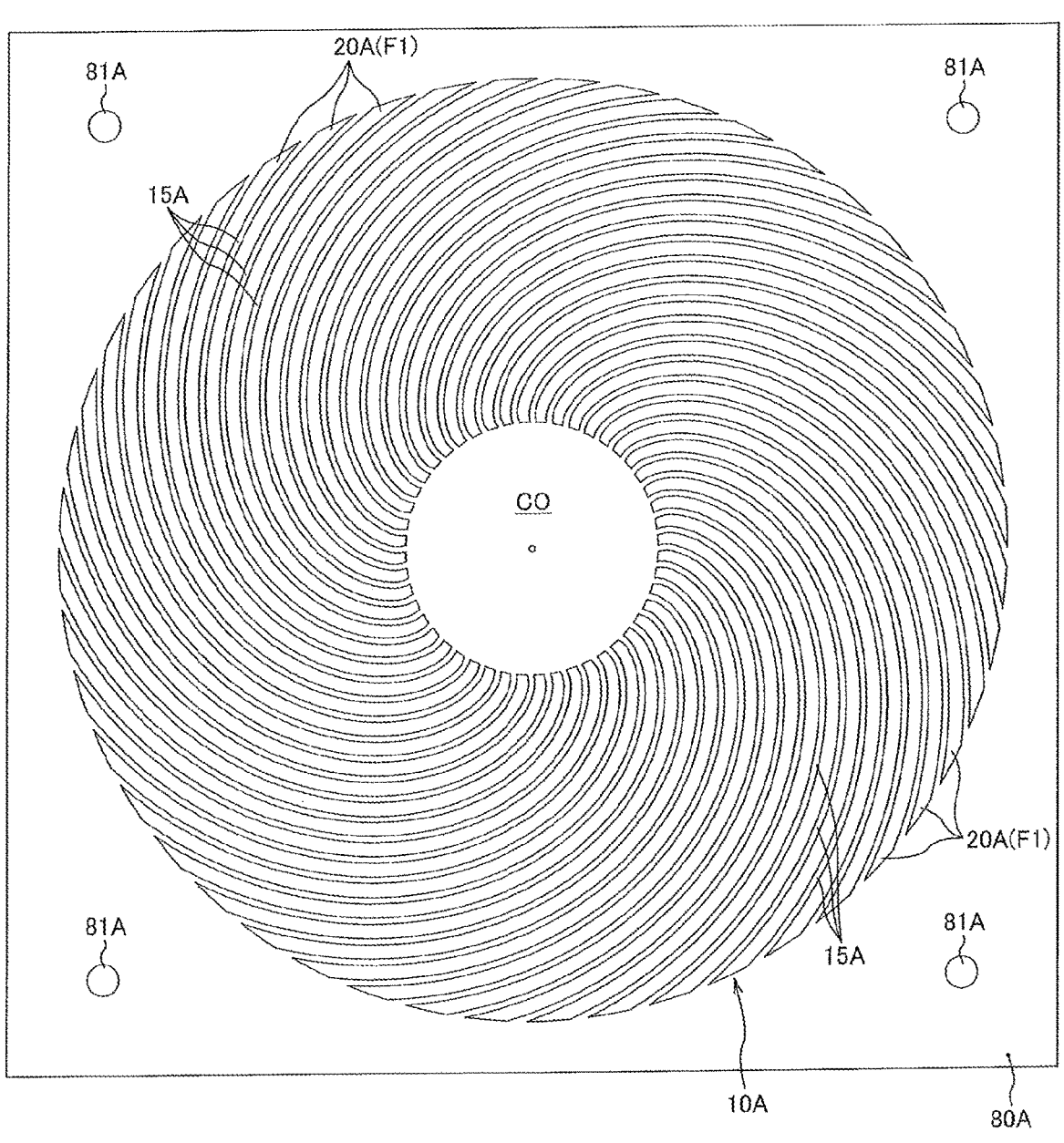
FIG. 4 is a plan view of a metal material 80A in which a metal plate member 10A is formed.
Figure 5:
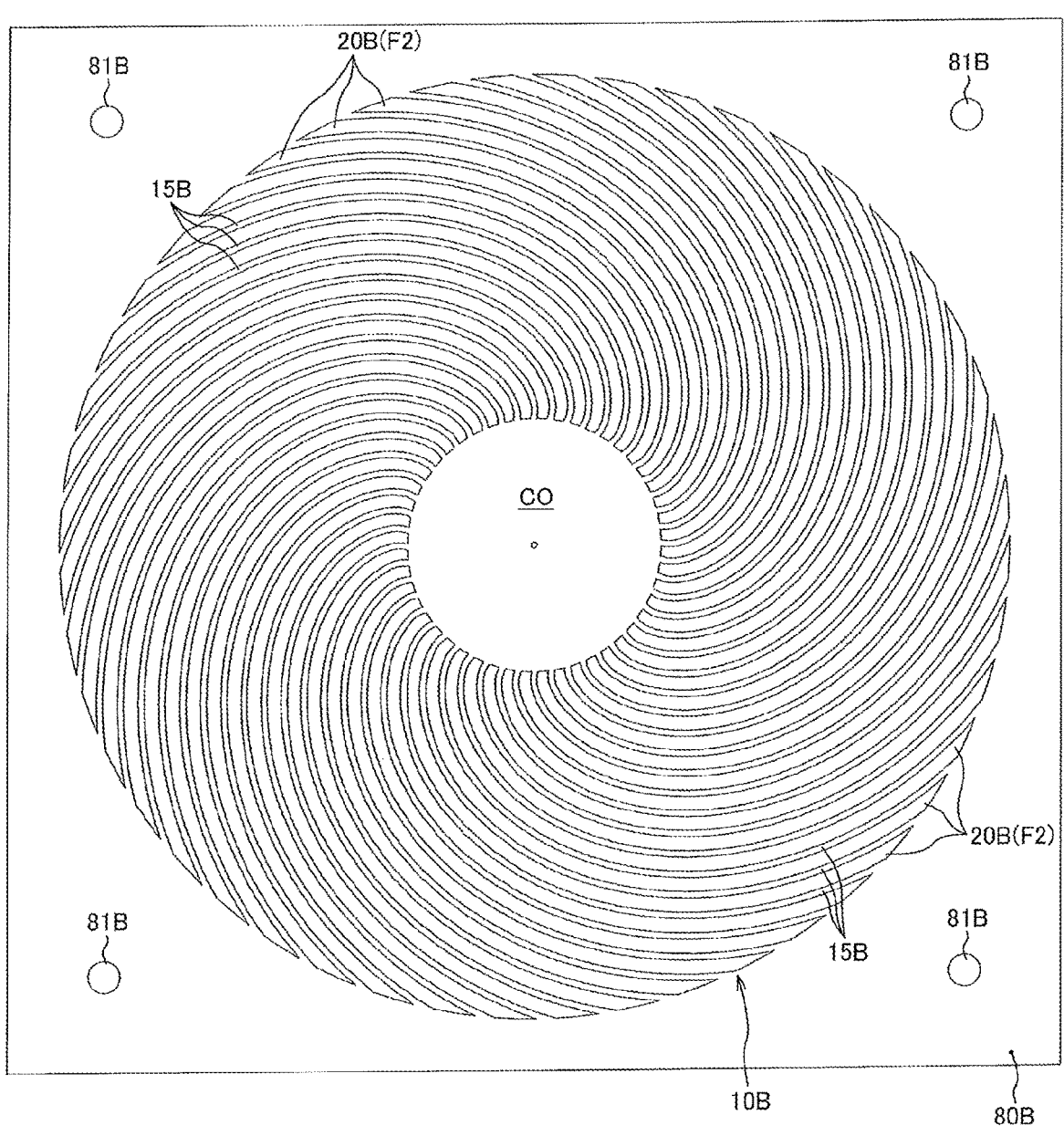
FIG. 5 is a back view of a metal material 80B in which a metal plate member 10B is formed.
Figure 6:
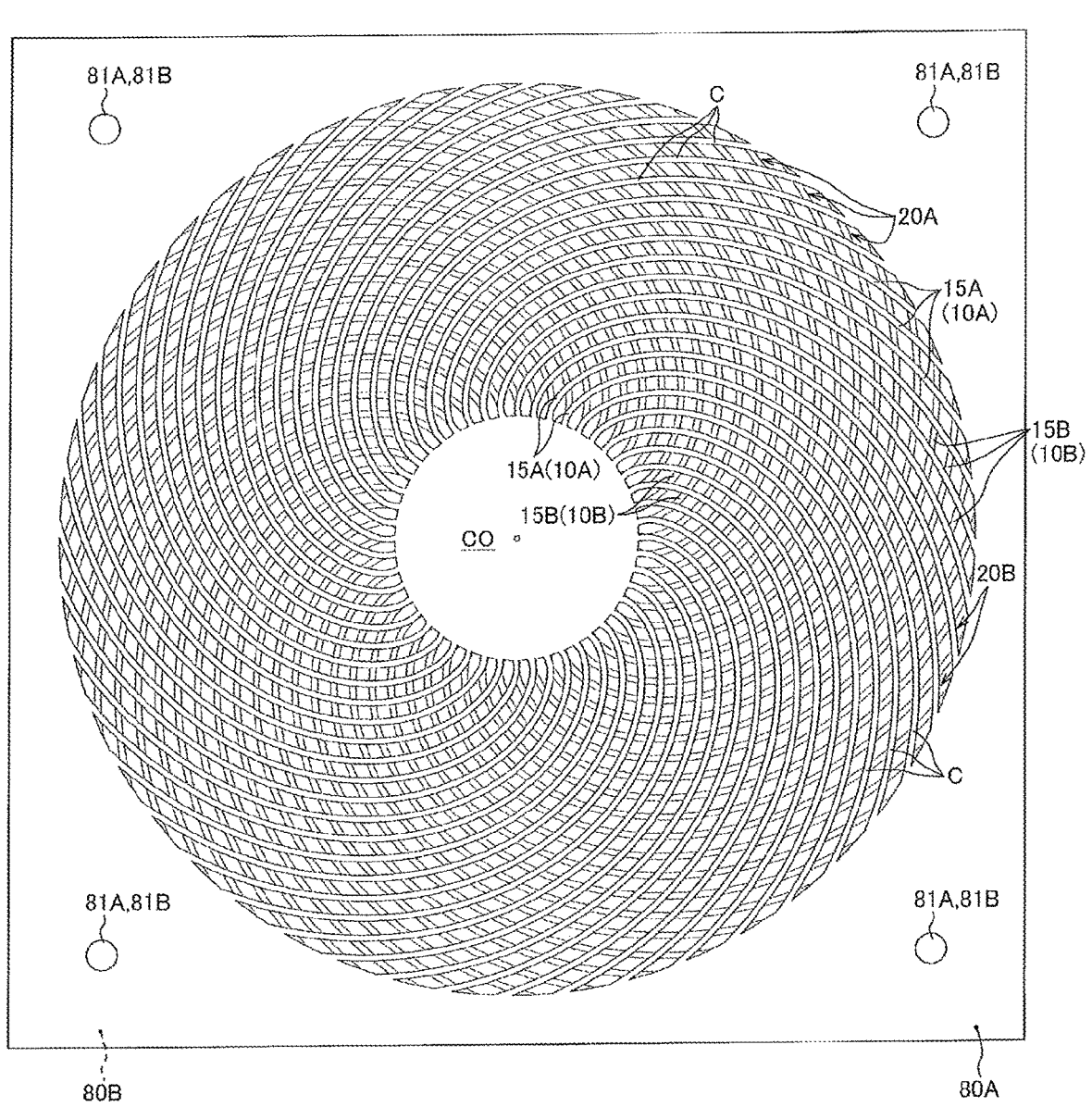
FIG. 6 is a plan view illustrating a state where the metal material 80A and the metal material 80B are preliminary fixed to each other with the metal plate member 10B stacked on the metal plate member 10A.
Figure 7:
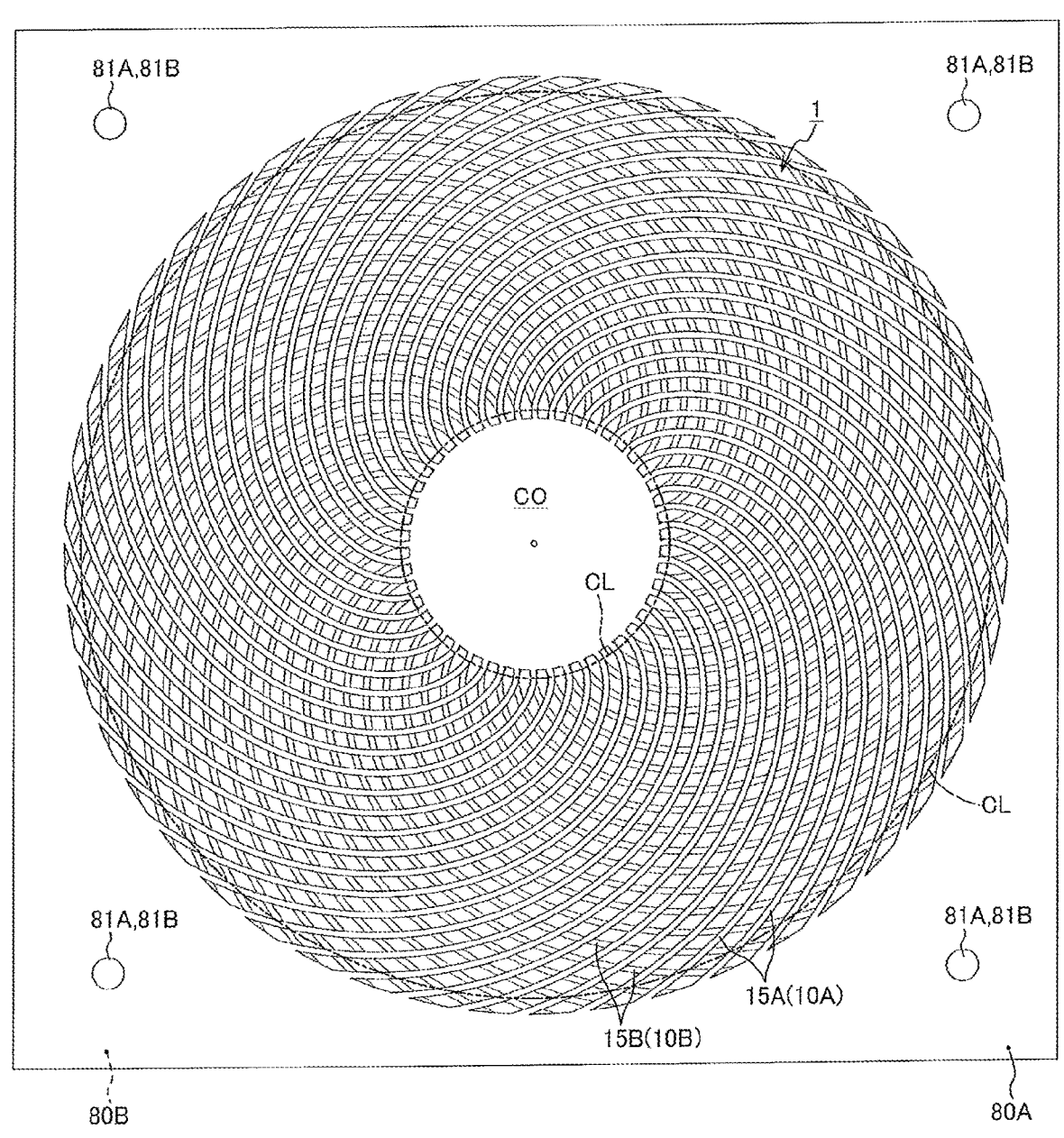
FIG. 7 is a plan view illustrating a procedure for removing an unnecessary portion of a retainer in the state in FIG. 6.

FIGS. 4 to 7 are explanatory diagrams illustrating a procedure of manufacturing the retainer 1 according to the first embodiment. FIG. 4 is a plan view of a metal material 80A in which the metal plate member 10A is formed, FIG. 5 is a back view of a metal material 80B in which the metal plate member 10B is formed, FIG. 6 is a plan view illustrating a state where the metal material 80A and the metal material 80B are preliminary fixed (positioned) to each other with the metal plate member 10B stacked on the metal plate member 10A, and FIG. 7 is a plan view illustrating a procedure for removing an unnecessary portion of a retainer in the state in FIG. 6.

The metal plate members 10A and 10B (the metal materials 80A and 80B) respectively illustrated in FIGS. 4 and 5 have the same shape as each other, and are different from each other only in that the former one is viewed from a front-surface direction and the latter one is viewed from a back-surface direction. Each of the metal plate members 10A and 10B can be manufactured by processing a metal material in the form of a metal flat plate by laser, and can be also manufactured by casting, powder metallurgy, or using a 3D printer or the like.

In a first process, the metal materials 80A and 80B that are two flat plates are prepared. That is, in a case of manufacturing the metal plate members 10A and 10B by laser processing, the metal materials 80A and 80B formed by flat plates made of stainless are used, respectively. The plate members 10A and 10B having the same structure as each other.

In a second process, the slits 20A or 20B having a predetermined shape are formed in each of the metal materials 80A and 80B in parallel to each other to penetrate, whereby the first metal plate member 10A and the second metal plate member 10B are formed in the areas of the respective metal materials. That is, the slits 20A or 20B having a regular shape as illustrated in the drawings are formed to penetrate in the metal material 80A or 80B in a spiral shape, whereby each metal plate member 10A or 10B is formed in the area of the metal material 80A or 80B. The rod member (or the wire rod) 15A as a flow-path forming member is located between the slits 20A parallel to each other, and the rod member (or the wire rod) 15B as a flow-path forming member is located between the slits 20B. In the processing stage in FIGS. 4 and 5, the inner ends in the radial direction of the rod members 15A and 15B are not separated from the center portions of the respective metal materials 80A and 80B, and the outer ends in the radial direction of the rod members 15A and 15B are not separated from outer circumferential portions of the respective metal materials 80A and 80B.

In a third process, one of the metal materials is stacked on the other metal material and preliminary fixed (positioned) thereto in such a manner that the back surface of one metal plate member 10B is positioned with respect to the back surface (one surface) of the other metal plate member 10A to have a predetermined positional relation.

That is, the metal material 80A is stacked on the metal material 80B and preliminary fixed thereto in such a manner that a back surface 10B" of the metal plate member 10B is positioned with respect to a back surface 10A" of the metal plate member 10A having the same shape as illustrated in FIG. 6 (see FIG. 1(*b*)). This preliminary fixing is carried out by using dedicated positioning jigs (not illustrated) and positioning holes 81A and 81B provided in appropriate positions (four corners) of the respective metal materials 80A and 80B.

In a fourth process, the crossings C of the rod members or wire rods configuring both the metal plate members 10A and 10B are integrated and fixed (sintered) to each other. That is, in the stage in FIG. 6, the crossings C of the rod members configuring both the metal plate members 10A and 10B are sintered by sintering means (not illustrated), whereby both the metal plate members are partially fixed to each other.

In a fifth process, excess portions of each metal material located in an inner circumferential edge and an outer circumferential edge of each metal plate member are cut and removed. That is, as illustrated in FIG. 7, the excess portions in the inner circumferential edge and the outer circumferential edge of each of the metal plate members 10A and 10B are cut and removed along cut lines CL illustrated with a long-dashed double-short dashed line. Accordingly, the donut-shaped retainer 1 as a finished product as illustrated in FIG. 1 is obtained.

The method of manufacturing the retainer 1 using two metal materials, which has been described with reference to the drawings, is merely an example. For example, the retainer 1 according to the present embodiment can be manufactured by a casting method in which a melted metal is poured into a mold to cast the retainer 1, a manufacturing method using powder metallurgy in which metal powder is molded using a mold and sintered, a manufacturing method using a 3D printer employing an ink-jet printing technique or the like, or a manufacturing method using cutting in which one metal material is cut and perforated by a machine tool, for example.

The casting method and the powder metallurgy can manufacture a mold by using the retainer 1 manufactured in advance and mass production becomes possible using this mold. The productivity can be thus increased.

The manufacturing method using cutting can manufacture the retainer 1 by using one thick metal material having a thickness corresponding to a total thickness of the two metal materials 80A and 80B by means of an endmill. That is, curved grooves (non-penetrating slits) corresponding to the slits 20A are formed in parallel to each other in a thick portion corresponding to one metal material 80A (a portion having a half thickness) from one surface side of the thick metal material by means of an endmill.

Subsequently, curved grooves corresponding to the slits 20B are formed in parallel to each other in a thick portion corresponding to the other metal material 80B (a portion having a half thickness) from the other surface side of the thick metal material by means of an endmill. At the time when the grooves corresponding to the respective slits 20A and 20B are formed, the flow-path crossings C' are formed at crossings of the grooves. The retainer 1 can be thus completed. A sintering process required in the manufacturing method using two metal materials can be omitted.

As the thick metal material used in cutting, a donut-shaped metal material having a center opening may be used, or a simple plate member as used in the manufacturing method in FIGS. 4 to 7 may be used.

That is, the retainer according to the present embodiment can be manufactured by various manufacturing methods other than the method using two metal materials (metal plate members).

This description can be also applied to a manufacturing method of a retainer 30 according to a second embodiment described later.

Second Embodiment

<Basic Configuration>

Figures 8A, 8B:
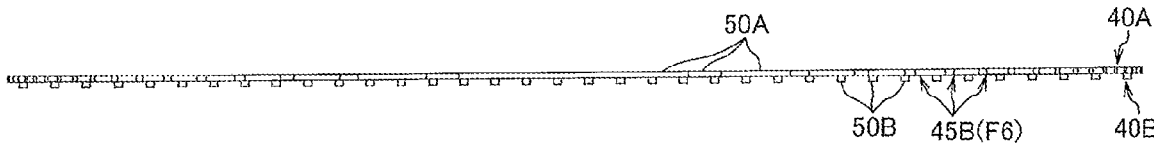
FIGS. 8(a) and (b) are a plan view and a front view illustrating a configuration of a retainer for filters according to a second embodiment.
Figure 9A:
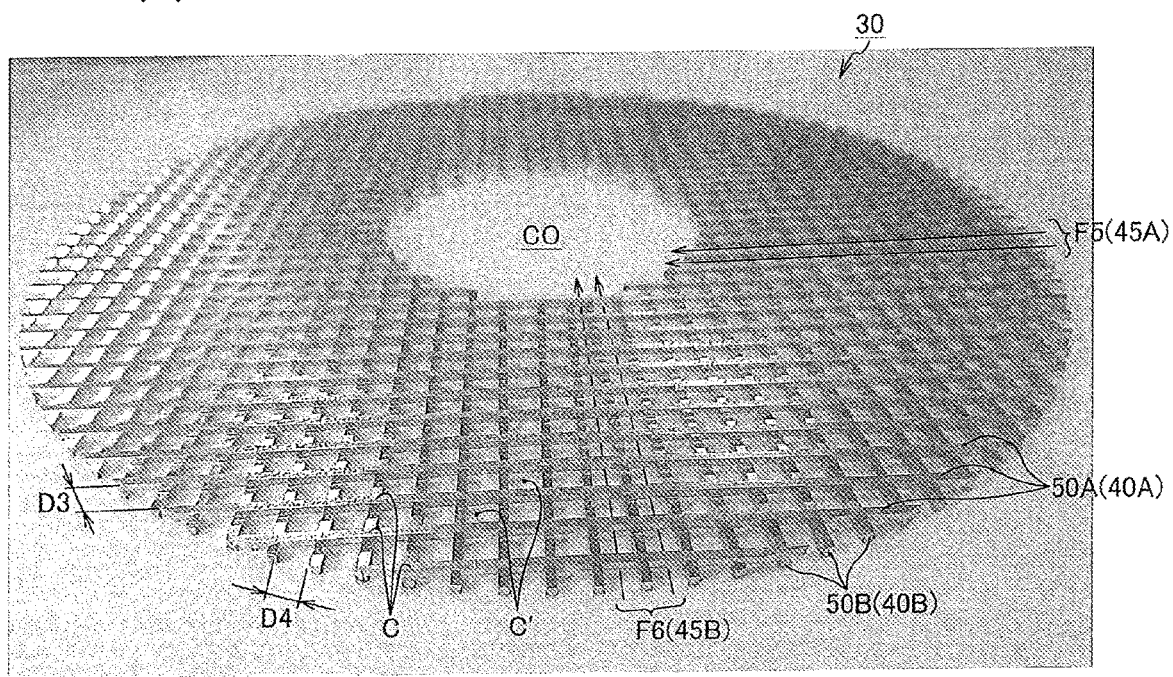
FIGS. 9(a) and (b) are a perspective view (a photograph) illustrating the configuration of the retainer for filters and a plan view (a photograph) of a main portion according to the second embodiment.
Figure 9B:
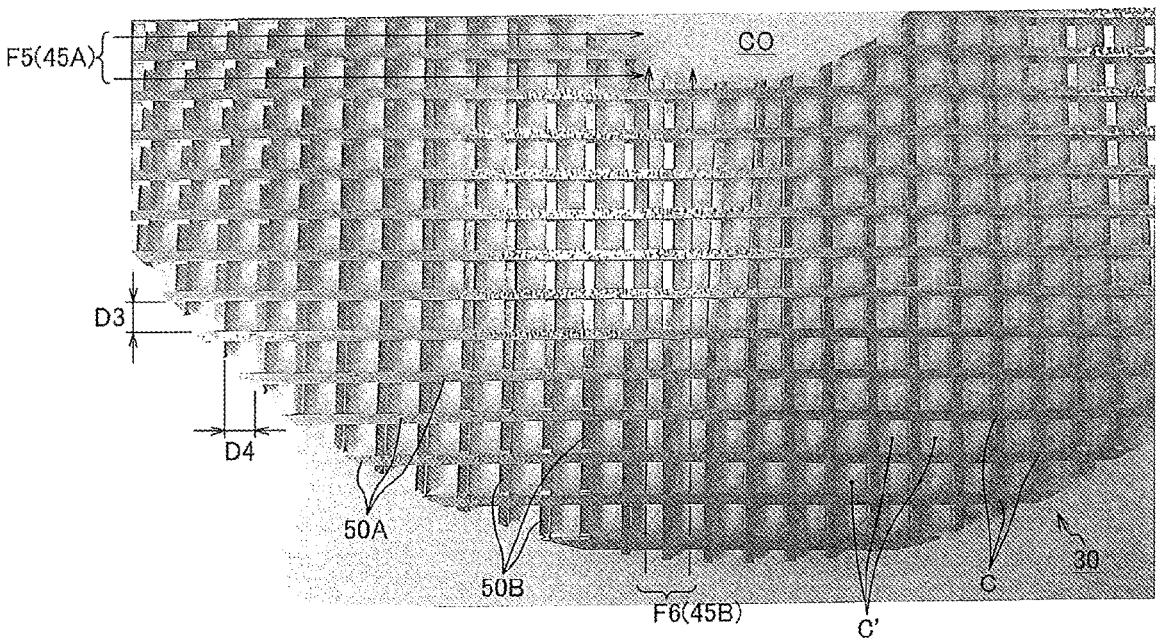
Figure 10:
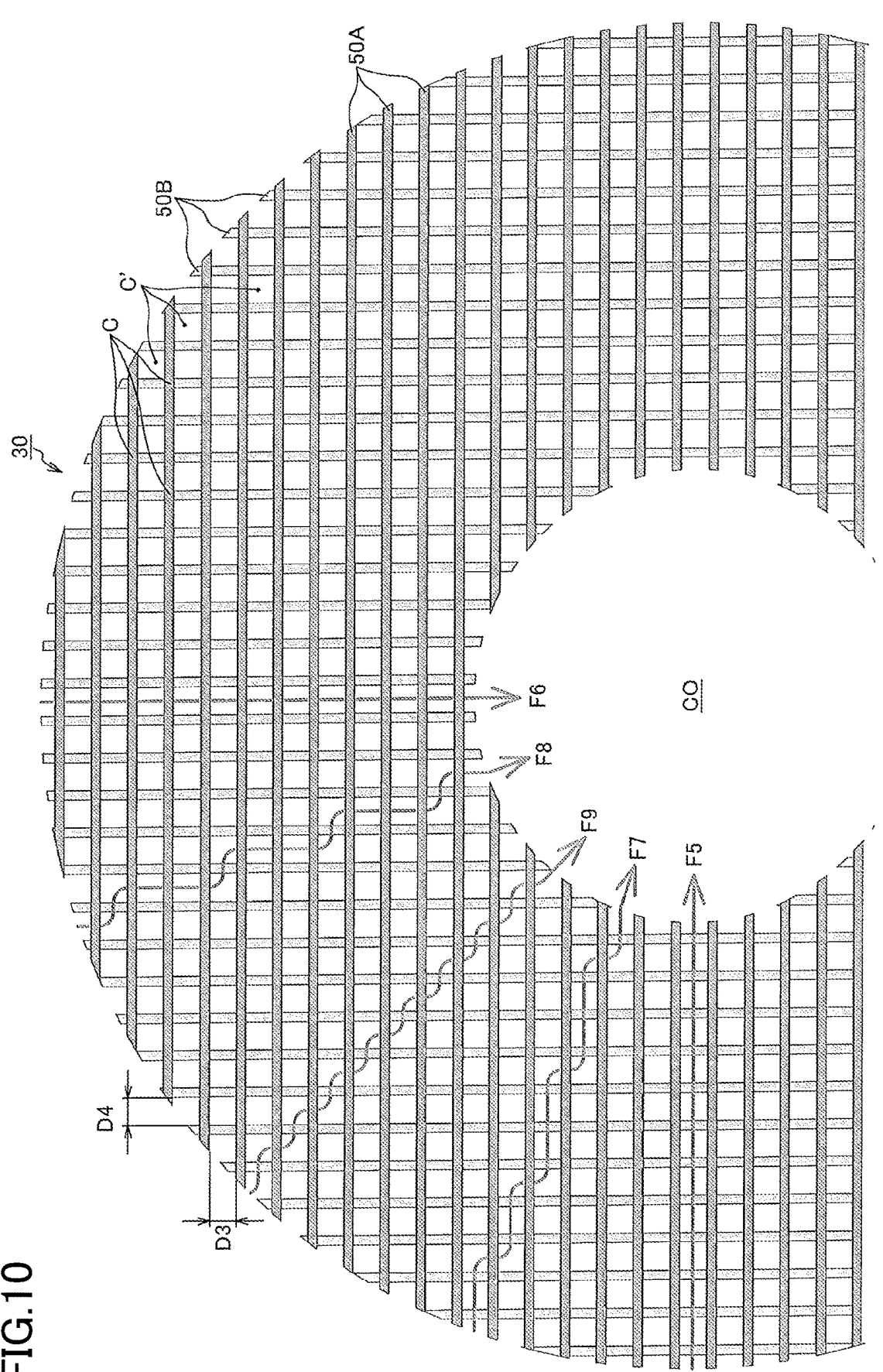
FIG. 10 is an explanatory diagram illustrating main flow paths formed in the retainer.

FIGS. 8(*a*) and (*b*) are a plan view and a front view illustrating a configuration of a retainer for filters according to the second embodiment, FIGS. 9(*a*) and (*b*) are a perspective view (a photograph) illustrating the configuration of the retainer for filters and a plan view (a photograph) of a main portion, and FIG. 10 is an explanatory diagram illustrating main flow paths formed in the retainer.

A retainer for filters (hereinafter, "retainer") 30 is arranged between the two filter media 108 in the leaf disc filter element 100 illustrated in FIG. 15 and used as means for supporting the filter media. The retainer 30 has a configuration including a first metal plate member 40A obtained by forming a number of slits 45A linearly extending in one direction in parallel to each other at a regular interval in a stainless (SUS304) plate with a thickness of 1.5 to 2 mm, for example, and a second metal plate member 40B obtained by forming a number of slits 45B linearly extending in another direction crossing the one direction at right angles in parallel to each other at a regular interval in an identical stainless plate, both the metal plate members being stacked and integrated with each other by sintering.

Each of the metal plate members 40A and 40B can be manufactured by forming the slits 45A or 45B by laser processing in a metal flat plate made of stainless with any shape, for example, a metal flat plate processed in advance to have a donut shape. Specifically, the retainer 30 includes the two metal plate members 40A and 40B that are configured by a plurality of linear rod members (or wire rods) 50A and 50B as flow-path forming members equally spaced with the slits 45A and 45B, the metal plate members 40A and 40B being integrated with each other by sintering the crossings C of the rod members 50A and 50B crossing each other in a lattice while respective surfaces of the two metal plate members 40A and 40B are stacked.

The rod members 50A linearly extending in the horizontal direction form a vertical grid, and the rod members 50B linearly extending in the vertical direction form a horizontal grid.

Although a group of the rod members 50A and a group of the rod members 50B are arranged to cross each other at an angle of 90 degrees in the present example, this arrangement is merely an example. With respect to one group of the rod members 50A, the group of the rod members 50B may be arranged to cross diagonally at an angle other than 90 degrees.

There are various methods of manufacturing each of the metal plate members 40A and 40B by forming the slits 45A or 45B and the rod members (or the wire rods) 50A or 50B in/on a metal material by laser processing. One example is laser processing using a metal material processed in advance to have a donut shape with the center opening CO as described in the first embodiment. In this case, the slits are not formed to penetrate (not to be opened) to an inner circumferential edge (an inner radial portion) and an outer circumferential edge (an outer radial portion) of the metal material, but are terminated before the inner circumferential edge and the outer circumferential edge. Accordingly, the metal plate members 40A and 40B can be prevented from being disassembled during manufacturing work.

That is, similarly to the first embodiment, in a case of manufacturing the metal plate members 40A and 40B by using metal materials that have been processed in advance to have a donut shape, coupling is maintained between the inner ends in the radial direction of the rod members 50A, between the outer ends in the radial direction of the rod members 50A, between the inner ends in the radial direction of the rod members 50B, and between the outer ends in the radial direction of the rod members 50B, thereby preventing the rod members from being disassembled. After the two metal materials each of which is coupled in the inner circumferential edge and the outer circumferential edge are stacked, and are sintered at the crossings C of the rod members, the coupled ends of the rod members in the inner circumferential edge and the outer circumferential edge are removed to make the rod members uncoupled. A configuration is thus obtained in which ends of the slits 45A and 45B on both sides in the longitudinal direction penetrate (are opened) to the inner radial portion and the outer radial portion. Since the rod members 50A and 50B configuring the two metal materials are sintered at each crossing C, shape retention can be ensured, and the rod members are not disassembled even by removal of the ends of the rod members.

Further, load applied to the retainer 30 when the retainer is assembled into a leaf disc filter element can be received by each rod member, more particularly, by the crossings C between the rod members as load receiving portions. Therefore, the strength and the shape retention can be maintained. Since all the intervals between the crossings C can be made constant, the flow resistance in flow paths formed in the slits and between the slits can be made stable.

The sizes and the shapes of the slits 45A and 45B of the metal plate members 40A and 40B do not have to be exactly the same as each other. An error or a deformation in micrometers or millimeters can be allowed.

In addition, it is not always necessary that the individual slits 45A or 45B are arranged at a regular interval over the entire length. The slits may be configured to have widths gradually increasing or decreasing from one end to the other end in the longitudinal direction.

The retainer 30 is required to have the strength for stably supporting filter media and the strength not to be crushed or deformed by pressure. At the same time, the retainer 30 has to have a low-resistance flow path formed therein which allows a melted resin passing through the filter media to move inward in the radial direction with small pressure loss.

In the retainer 30 according to the present embodiment, the rod members 50A configuring one metal plate member 40A form linear flow paths F5 configured by the slits 45A that extend at a regular interval in the horizontal direction in FIGS. 8, 9, and 10. The rod members 50B configuring the other metal plate member 40B form linear flow paths F6 configured by the slits 45B that extend at a regular interval in the vertical direction.

The upper flow paths F5 and the lower flow paths F6 cross each other in a lattice in plan view and communicate with each other at the flow-path crossings C' of the slits.

A flow path among the many flow paths F5, which is opened to the center opening CO at its inner end, is the shortest flow path along the radial direction of the retainer 30. A flow path among the flow paths F6, which is opened to the center opening CO at its inner end, is the shortest flow path along the radial direction of the retainer.

A flow path among the flow paths F5 and F6, which is not opened to the center opening CO, allows a melted resin to flow to the center opening CO while changing a path of the melted resin to another flow path via the flow-path crossings C'.

Next, the flow path F7 forms a route that is bent in a zigzag manner and allows the adjacent flow paths F5 to communicate with each other via the flow-path crossing C' in a meandering manner, and a flow path F8 forms a route that is bent in a zigzag manner and allows the flow paths F6 adjacent to each other to communicate with each other via the flow-path crossing C' in a meandering manner. A flow path F9 forms a zigzag route connecting the flow-path crossings C' linearly arranged in the radial direction.

The cross-sectional area of the flow path at the flow-path crossing C' does not become narrow as compared with the cross-sectional area of the flow path F5 or F6. Therefore, increase of the flow resistance, which causes large reduction of the flow speed, does not occur in this portion.

The flow paths F5 to F9 illustrated in FIG. 10 are main flow paths. Other than these flow paths, flow paths are formed which run to various directions at various angles.

Similarly to the first embodiment, by appropriate setting widths D3 and D4 of the respective slits 45A and 45B, both the resistance against a melted resin as a fluid to be filtered and a posture-maintaining performance of a porous support plate can be achieved in an appropriate manner. According to the configuration of the present embodiment, the widths D3 and D4 of the slits 45A and 45B configuring the metal plate members 40A and 40B, respectively, (that is, intervals between the rod members) can be formed with high dimension accuracy and be arranged regularly. Therefore, the widths D3 and D4 can be maintained to be constant.

Since the metal plate members 40A and 40B can be manufactured by laser processing, the dimension accuracy can be ensured. In addition, since the metal plate members 40A and 40B are made of metal with high strength, such as stainless, the strength of the rod members (the thickness and the shape) can be set so as not to allow the rod members to be crushed and deformed even under a high pressure. Accordingly, the widths D3 and D4 of the respective slits 45A and 45B can be maintained to be optimum, and the passing resistance of a melted resin can be maintained to be constant at a low value.

By applying the retainer 30 according to the present embodiment to a retainer of a leaf disc filter element, the flow paths F6 crossing the flow paths F5 are formed in the metal plate member 40B on the back surface side in addition to the flow paths F5 formed in the metal plate member 40A on the front surface side.

The flow paths F5 and F6 are formed along the upper side and the lower side of a boundary surface (a joint surface) between the two metal plate members 40A and 40B, respectively, in such a manner that the flow paths F5 or F6 are spaced from each other with a uniform width and a uniform height. In the flow paths F5 and F6, there is neither an obstacle nor a route running zigzag in the vertical direction or the horizontal direction. Therefore, the resistance when a melted resin passes can be reduced, so that pressure loss can be reduced. Accordingly, the flow speed of the melted resin is prevented from becoming non-uniform, and staying of the melted resin caused by the non-uniformity is also prevented, whereby the product quality can be maintained.

Further, since the flow paths F5 and F6 in a vertical positional relation communicate with each other via the flow-path crossings C' of the slits, and since the other flow paths F7, F8, and F9 defining various routes are formed, the melted resins can mutually flow between the flow paths F5 and F6 to be mixed. That is, since the melted resins that have passed through the upper and lower filter media can be mixed via the crossings, variation in the quality of the melted resin caused by variation in the filtering capacity of the filter medium can be eliminated.

In particular, since each of the flow paths F5 and F6 is a gentle linear route (a flow path) that is less displaced in the vertical direction and has a uniform width over the entire length, the passing resistance of the melted resin can be largely reduced.

It is apparent that there is almost no obstacle in each flow path F5 or F6 and that a linear route with a uniform width and a determined path is formed. That is, according to the present invention, groups of the flow paths F5 and F6 without variation in routes, which are directed to the inner radial portion, are formed, whereby the directionality of flow paths for a melted resin can be improved, and the melted resin can be made to efficiently flow to the inner radial portion by the groups of the flow paths F5 and F6 and to flow to a discharge pipe located in the inner radial portion.

Further, also in the flow paths F7, F8, and F9 other than the main flow paths F5 and F6, short routes to the radial direction are formed to meander through the main flow paths F5 and F6 alternately. Therefore, the melted resin can be made to efficiently flow to the inner radial portion and to the discharge pipe located in the inner radial portion.

Actions and effects other than those described above are in common with those of the first embodiment and therefore redundant explanations thereof are omitted.

<Manufacturing Method of Retainer According to Second Embodiment>

Figure 11:
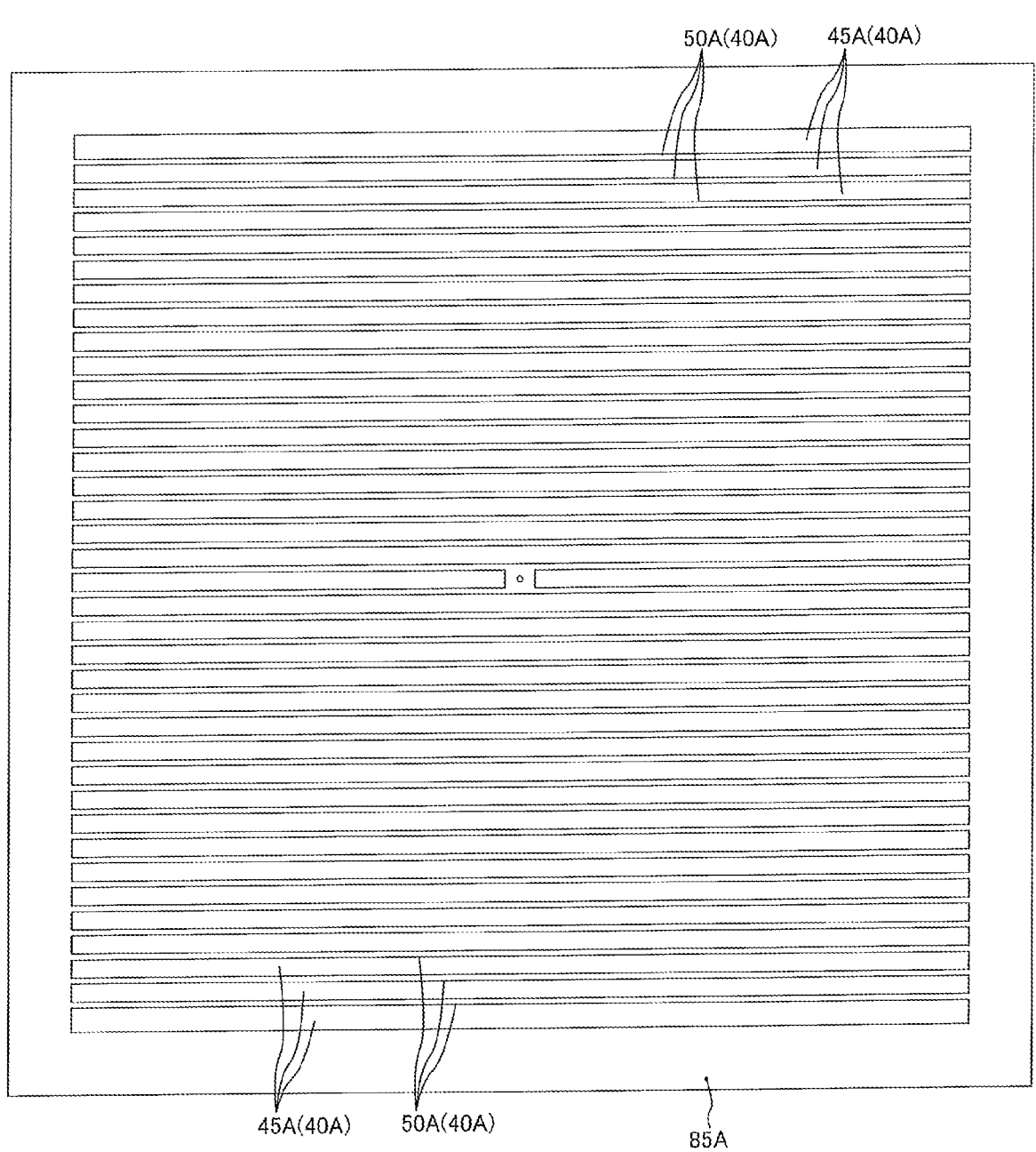
FIG. 11 is a plan view of a metal material 85A in which a metal plate member 40A is formed.
Figure 12:
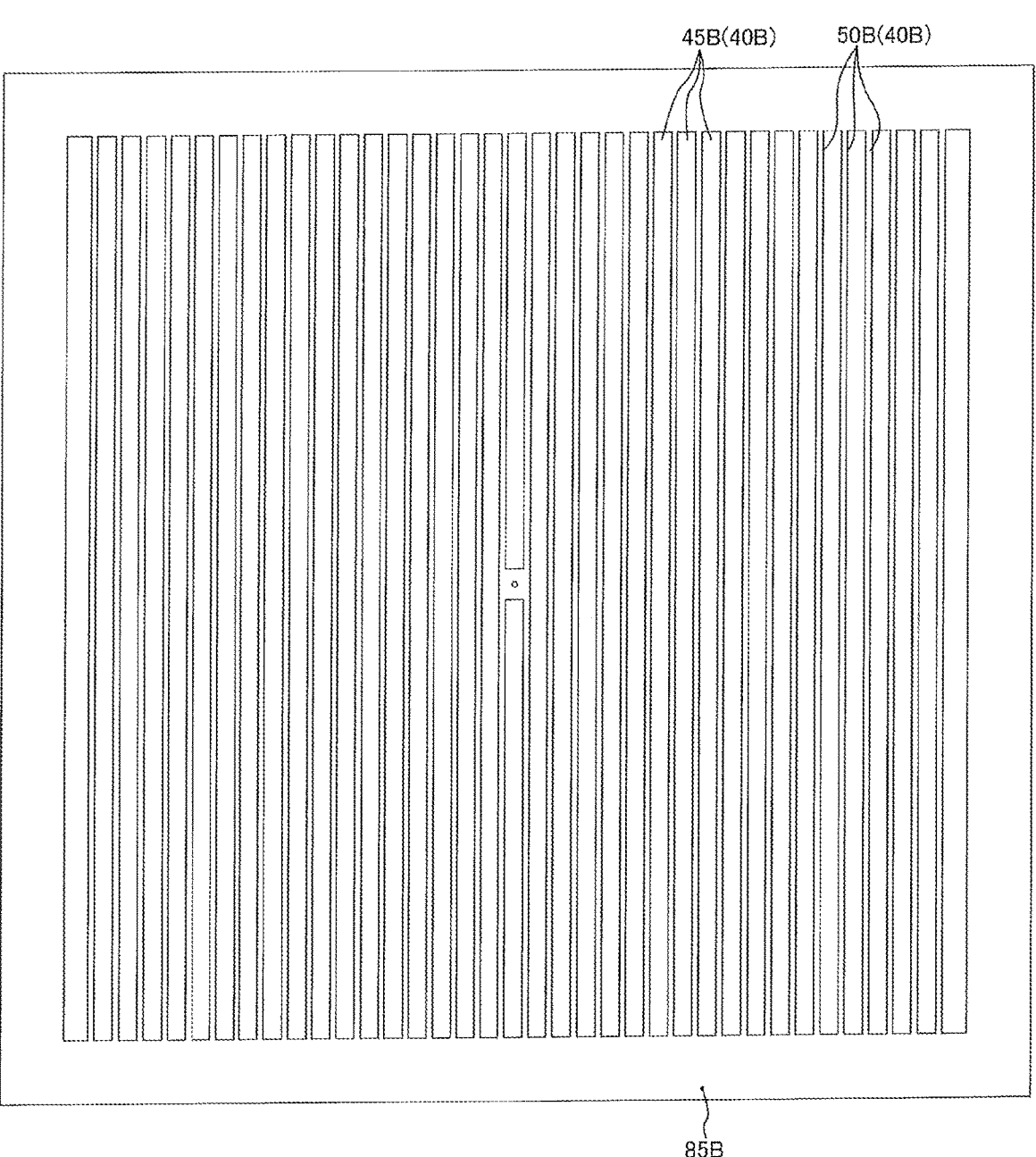
FIG. 12 is a plan view of a metal material 85B in which a metal plate member 40B is formed.
Figure 13:
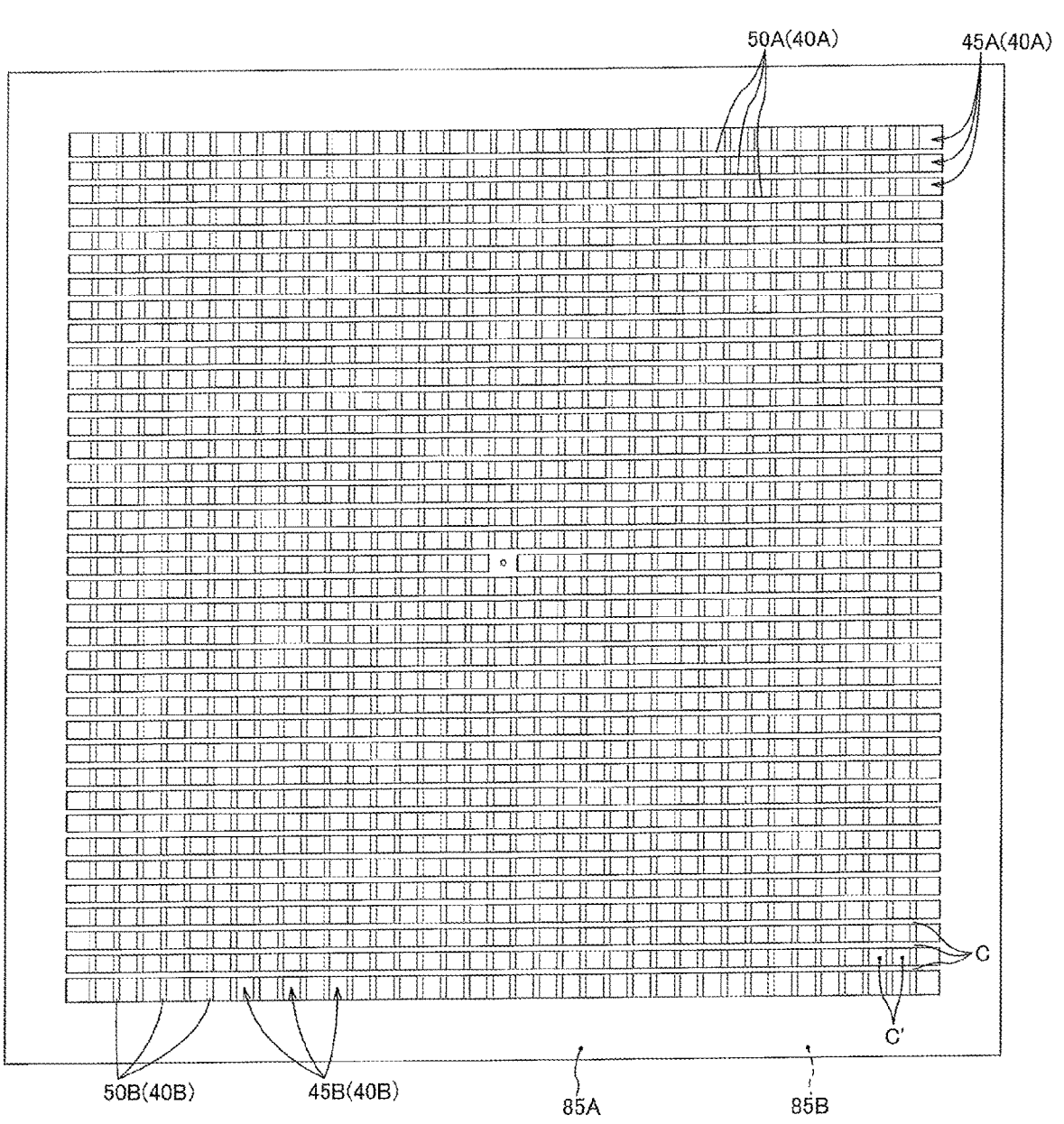
FIG. 13 is a plan view illustrating a state where the metal material 85A and the metal material 85B are preliminary fixed to each other with the metal plate member 40B stacked on the metal plate member 40A.
Figure 14:
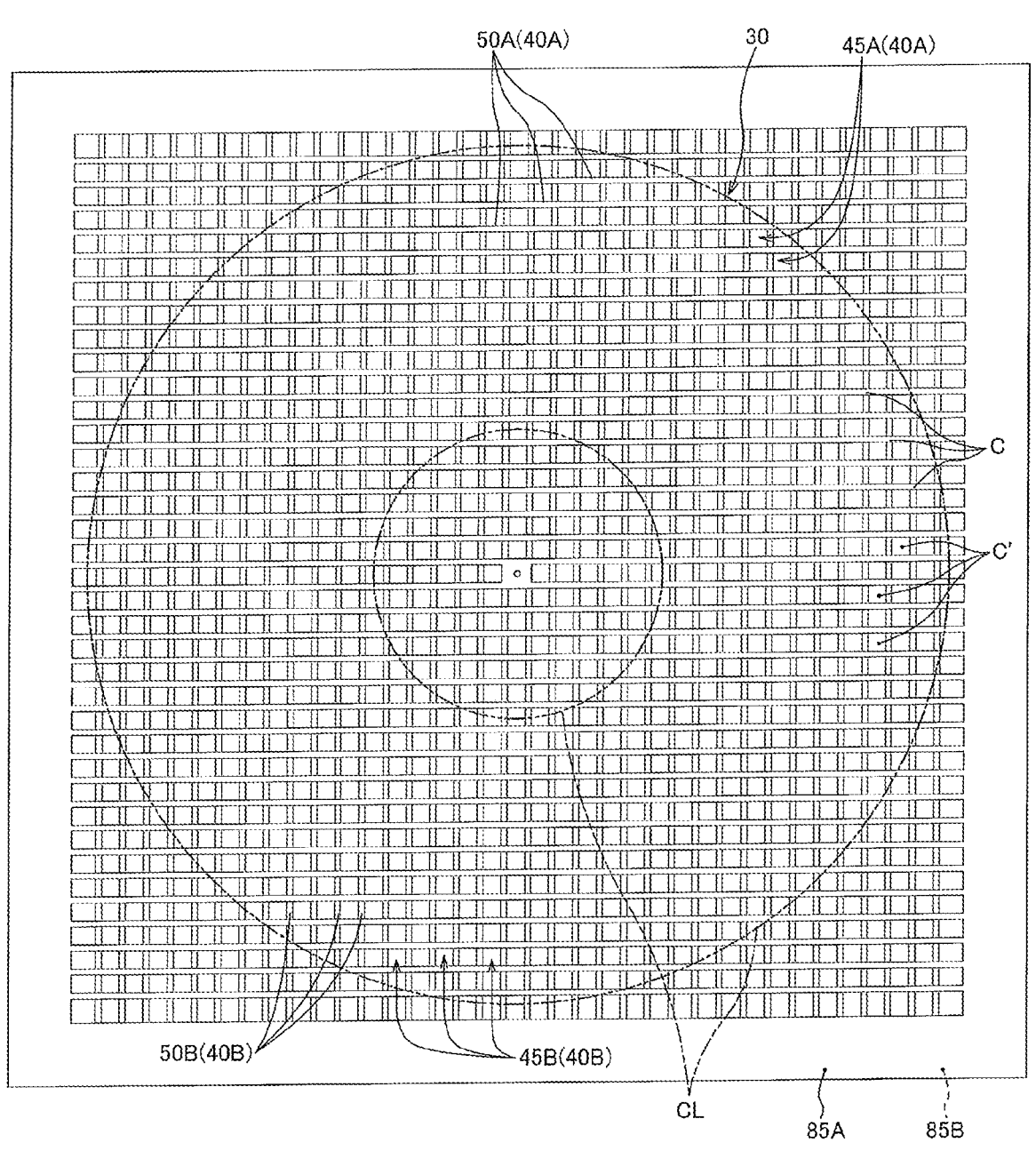
FIG. 14 is a plan view illustrating a procedure for removing an unnecessary portion of a retainer in the state in FIG. 13.

FIGS. 11 to 14 are explanatory diagrams illustrating a procedure of manufacturing the retainer 30 according to the second embodiment. FIG. 11 is a plan view of a metal material 85A in which the metal plate member 40A is formed, FIG. 12 is a plan view of a metal material 85B in which the metal plate member 40B is formed, FIG. 13 is a plan view illustrating a state where the metal material 85A and the metal material 85B are preliminary fixed to each other with the metal plate member 40B stacked on the metal plate member 40A, and FIG. 14 is a plan view illustrating a procedure for removing an unnecessary portion of a retainer in the state in FIG. 13.

The metal plate members 40A and 40B respectively illustrated in FIGS. 11 and 12 have the same shape as each other, and are different from each other only in that extending directions of slits are arranged to cross each other at 90 degrees. Each of the metal plate members 40A and 40B can be manufactured by processing a metal flat plate by laser, and can be also manufactured by casting or using a 3D printer or the like.

In a case of manufacturing the metal plate members 40A and 40B by laser processing, the metal materials 85A and 85B formed by flat plates made of stainless are used, respectively (a process of preparing the metal materials 85A and 85B). In each of the metal materials 85A and 85B, a plurality of the linear slits 45A or 45B having the same shape as each other as illustrated in the drawings are formed in parallel to each other to penetrate, whereby the metal plate member 40A or 40B is formed at a predetermined position of the metal material 85A or 85B (a process of forming the first and second metal plate members). The rod member (or the wire rod) 50A as a flow-path forming member is located between the slits 45A, and the rod member (or the wire rod) 50B is located between the slits 45B. In the stage illustrated in FIGS. 11 and 12, both ends in the longitudinal direction of the rod members 50A and 50B stay connected to the outer circumferential edges of the metal materials 85A and 85B. Therefore, the rod members cannot be disassembled.

Subsequently, the metal material 85A is stacked on the metal material 85B and preliminary fixed thereto in such a manner that one surface of the metal plate member 40B is positioned with respect to one surface of the metal plate member 40A having the same shape as illustrated in FIG. 13 (a process of preliminary fixing the metal materials to each other). This preliminary fixing uses dedicated positioning jigs (not illustrated).

In this stage, the crossings C of the rod members respectively configuring the metal plate members 40A and 40B are sintered by sintering means (not illustrated), whereby both the metal plate members are fixed and integrated with each other (a process of integrating and fixing (sintering) the crossings C).

Subsequently, as illustrated in FIG. 14, excess portions in the inner circumferential edge and the outer circumferential edge of each of the metal plate members 40A and 40B are cut and removed along cut lines CL illustrated with a long-dashed double-short dashed line, whereby the retainer 30 having a donut shape as a finished product as illustrated in FIG. 9 is obtained (a process of cutting and removing an excess portion of each metal material).

Similarly to the manufacturing method of the retainer 1 according to the first embodiment, also for the manufacturing method of the retainer 30 according to the second embodiment, the method of manufacturing the retainer 1 by using two metal materials which has been described with reference to the drawings is merely an example. That is, the retainer 30 according to the present embodiment can be manufactured by a casting method, a manufacturing method using a 3D printer, a manufacturing method using cutting, and a manufacturing method using powder metallurgy, for example. In other words, the retainer 30 according to the present embodiment can be manufactured by various manufacturing methods other than the method using two metal materials (metal plate members).

[Application Example to Leaf Disc Filter Element]

Figure 15A:
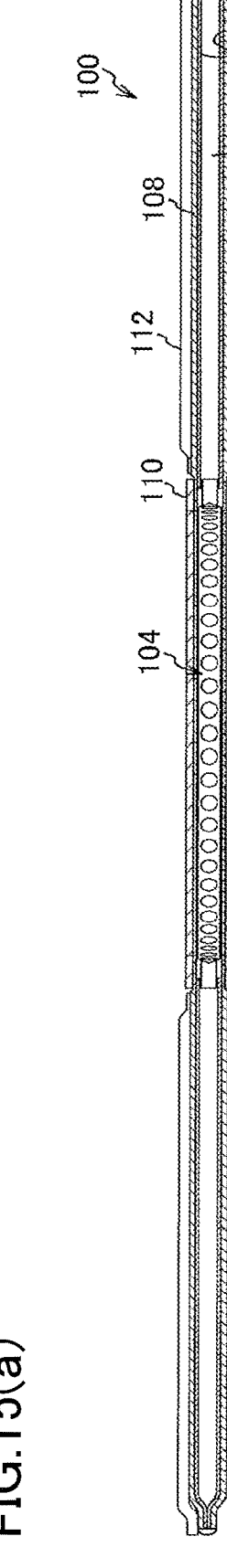
FIGS. 15(a) and (b) are a front view of a vertical section of a leaf disc filter element using a retainer 1 or 30 according to the present invention and an enlarged view of a portion of that leaf disc filter element.
Figure 15B:
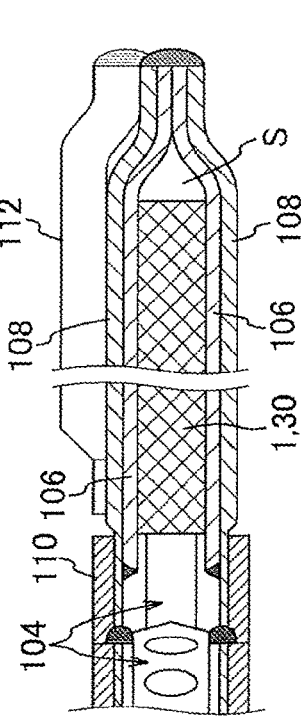

FIGS. 15(*a*) and (*b*) are a front view of a vertical section of a leaf disc filter element using the retainer 1 or 30 according to the present invention and an enlarged view of a portion of that leaf disc filter element.

The leaf disc filter element 100 roughly includes the retainer 1 or 30 formed by the donut-shaped metal plate members 10A and 10B (40A and 40B), a hub 104 formed by a solid metal material fixed to the center (the center opening CO) of the retainer, the donut-shaped punching plates (porous support plates) 106 arranged on upper and lower outer surfaces of the retainer 1 or 30 and fixed to the hub 104 by welding at inner radial portions, the donut-shaped filter media 108 arranged on outer side surfaces of the punching plates, rings 110 as annular bodies arranged on upper and lower surfaces of the outer circumference of the hub, respectively, and fixed to the hub by welding while the outer surfaces of the filter media 108 on the inner side in the radial direction are sandwiched between the rings 110 and the hub, and spacers 112 formed by a plurality of rod-shaped bodies arranged on the outer surface of the upper filter medium 108 and extending radially from a portion near the center in the form of a spoke. Outer ends in the radial direction of the punching plates 106, the filter media 108, and each spacer 112 are fixed by welding.

A melted resin that has passed through the filter medium 108 and the punching plate 106 in that order enters into the retainer 1 or 30 from the outer surface of the retainer, is collected to the center portion through the flow paths F1 to F4 of the retainer 1 or the flow paths F5 to F9 of the retainer 30, for example, and is sent to a discharge pipe (not illustrated) in the center portion via a hole provided in the hub 104.

Further, a space S is formed between the outer circumferential edge of the retainer 1 or 30 and the inner wall of the outer circumferential edge of the spacer 112. A melted resin that has entered into the space from a portion of the filter medium located outside the space S moves inward in the radial direction within the retainer 1 or 30 through each flow path of the retainer and is sent to the discharge pipe (not illustrated) in the center portion via the hole provided in the hub 104. Since outer ends in the radial direction of the flow paths are opened to (communicate with) the space S, the melted resin that has passed through the filter medium in this manner can flow inward in the radial direction via the retainer without staying in the outer circumferential portion.

Further, it is important that the quality of the melted resins that have been filtered by the two filter media 108 and have entered into the retainer 1 or 30 is uniform. In the metal plate members 10A and 10B (40A and 40B) configuring the retainer according to the present invention, the melted resins that have passed through the filter media are joined together and mixed to become uniform in each flow path.

Figure 16A:
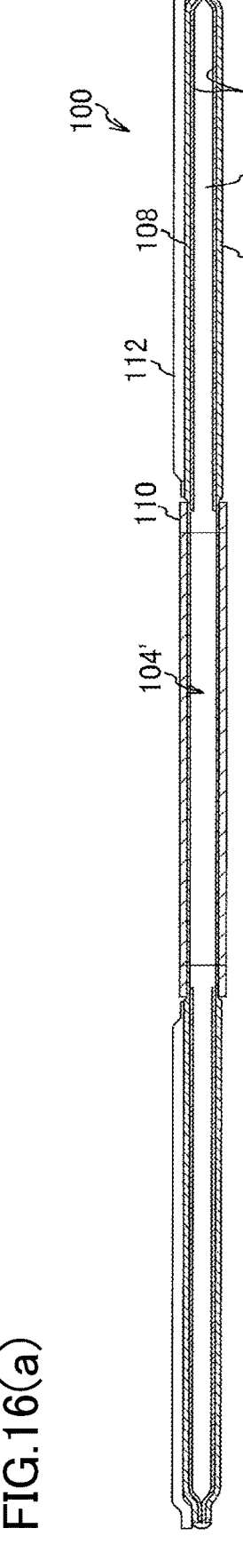
FIGS. 16(a) and (b) are a front view of a vertical section of a leaf disc filter element using a modification of a spiral retainer 1 according to the present invention and an enlarged view of a portion of that leaf disc filter element.
Figure 16B:
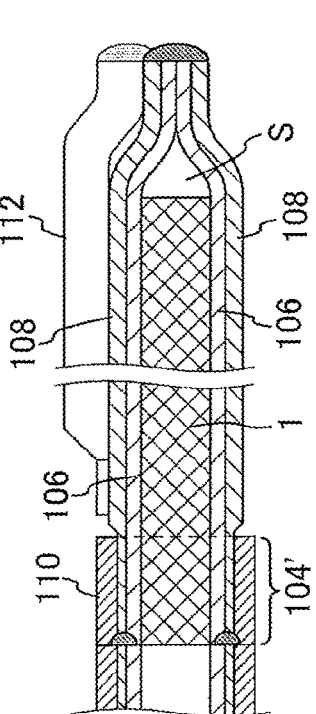

FIGS. 16(*a*) and (*b*) are a front view of a vertical section of the leaf disc filter element 100 using a modification of the spiral retainer 1 according to the present invention and an enlarged view of a portion of that leaf disc filter element. Portions identical to those in FIG. 15 are denoted by like reference signs and redundant explanations thereof are omitted.

In the spiral retainer 1, the center opening CO can be manufactured integrally as a shape that also serves as the hub 104. That is, a portion of the inner circumferential edge of the center opening CO of the retainer is formed to further extend to the inner side in the radial direction, whereby a hub 104' configured by the flow-path forming members 15A and 15B is formed in a portion corresponding to the hub 104 in FIGS. 15. Accordingly, the inner radial portion of the retainer can also have all or a part of functions of the hub 104. In this case, the retainer 1 having a structure including the hub 104' can be manufactured collectively by a series of manufacturing procedures. In this manufacturing, the compressive strength of the flow-path forming members 15A and 15B configuring the hub 104' can be easily set to the extent enough to function as a hub (the extent not causing compressive deformation). In a conventional mesh retainer formed by wire netting, the shape of the center opening can be configured to also function as a hub. However, since a portion serving as the hub in this case is formed by wire netting, the compressive strength is low and compressive deformation occurs so that such a mesh retainer is not practical.

<Summary of Configurations, Actions, and Effects of Present Invention>

The retainer for filters 1 or 30 according to a first aspect of the present invention includes the first metal plate member 10A or 40A in which a plurality of flow-path forming members (rod members or wire rods) having a predetermined curved shape or a linear shape in plan view are arranged on the same plane in parallel to each other with a predetermined interval to form a donut shape as a whole, and the second metal plate member 10B or 40B having a configuration equivalent to that of the first metal plate member 10A or 40A, and has a configuration in which crossings of the flow-path forming members configuring the respective metal plate members are fixed while one surface of the second metal plate member is stacked on one surface of the first metal plate member. The retainer 1 or 30 is characterized in that the flow-path flowing members 15A or 50A configuring the first metal plate member and the flow-path flowing members 15B or 50B configuring the second metal plate member form a line symmetric shape in plan view.

Since each metal plate member has a configuration in which the flow-path forming members having a predetermined curved shape or a linear shape in plan view are arranged on the same plane in parallel to each other with a predetermined interval to form a donut shape as a whole, the main flow paths F1 to F9 are formed on both sides of a boundary surface that is a surface where the two metal plate members are joined to each other. There is no obstacle in each of the flow paths F1, F2, F5, and F6, and each of the flow paths F1, F2, F5, and F6 allows an outer circumferential edge of each metal plate member and the inside (the center opening CO) to directly communicate with each other. Therefore, the fluidity of a melted resin to the center can be increased. The flow paths F3 and F4 straddling the flow paths F1 and F2 configuring the retainer 1 and the flow paths F7, F8, and F9 straddling the flow paths F5 and F6 configuring the retainer 30 each have a fine zigzag portion in the thickness direction of the retainer, but can smoothly guide the melted resin to the retainer center in a short distance almost in a straight line.

Therefore, effects of low pressure loss, high strength, and high pressure resistance can be obtained.

In the retainer 1, the flow-path forming members 15A or 15B are formed to have a shape of a spiral curve (a curved line), the flow-path forming members 15A are arranged in parallel to each other, and the flow-path forming members 15B are arranged in parallel to each other. By this configuration, the slits (flow paths) 20A and 20B respectively formed between the flow-path forming members 15A and between the flow-path forming members 15B can have an identical spiral shape. The individual flow-path forming members described in the embodiments have a shape of a narrow-width strip in plan view and have a uniform width. However, such flow-path forming members are merely an example.

The flow-path forming members 50A or 50B configuring the retainer 30 are arranged to be linear in parallel to each other, and the flow-path forming members 50A and 50B are arranged in a lattice. By this configuration, the slits (flow paths) 45A and 45B respectively formed between the flow-path forming members 50A and between the flow-path forming members 50B can have an identical linear shape. It is preferable that the flow-path forming members have a shape of a narrow-width strip in plan view and have a uniform width.

The concept of the flow-path forming member (the skeleton member) includes a plate member in the form of an elongate strip, in addition to a curved or linear rod member (wire rod).

By using the retainer for filters (having a donut shape) as a retainer of a leaf disc filter, a melted resin is enabled to efficiently flow with a stable flow amount in the radial direction (the radial direction and other directions toward the center in the radial direction) that is a discharge direction of the melted resin filtered by the filter medium in a leaf disc filter type filtration device.

Further, the melted resins that have been filtered by the two filter media of the leaf disc filter element and have entered into the retainer enter from the flow paths configuring the two metal plate members and are then joined together. Therefore, the melted resins can be mixed and become uniform in the flow paths.

In addition, in a case where the intervals D1, D2, D3, and D4 between the rod members (the widths of the respective flow paths) are too large, the porous support plate (the punching plate) located between the filter medium and the retainer is curved and deformed to cause deformation of the filter medium when a pressure is applied from the melted resin passing through the filter medium. Meanwhile, in a case where the intervals are too small, the porosity is reduced, and the passing resistance is increased. Although it is difficult to keep a balance, the present invention enables fine adjustment to be performed by adjusting the intervals between the flow-path forming members so as to set the intervals D1, D2, D3, and D4 to optimum values. Depending on the setting of the intervals D1, D2, D3, and D4, the filter medium can be received directly by the retainer without the porous support plate, whereby the leaf disc filter element can be made thinner.

By forming the metal plate member by a metal material with a sufficient strength, for example, stainless, deformation caused by pressure during filtration can be prevented, so that the strength, the durability over time, and the shape retention can be increased.

The donut shape means a shape having the center opening CO concentrically penetrating through a circular plate at the center of the circular plate.

The retainer for filters 1 according to a second aspect of the present invention is characterized in that the flow-path forming members (the rod members or the wire rods) 15A or 15B having the predetermined curved shape in plan view are arranged in parallel to each other to form a spiral shape.

Flows along the spiral flow paths F1 and F2, which are directed to the center (the center opening CO) of the donut-shaped retainer, and the zigzag flow paths F3 and F4 that meander through those flow paths are formed in a complex manner. Each flow path is formed over the enter circumference along the circumferential direction of the retainer, and the flow speed and the flow amount in the individual flow paths F1, F2, F3, and F4 are the same regardless of a difference between positions in the circumferential direction.

The retainer for filters 1 or 30 according to a third aspect of the present invention is characterized in that a front surface and a back surface of the flow-path forming member (the rod member or the wire rod) are flat surfaces.

By forming surfaces (the front surface and the back surface) of the flow-path forming member 15A, 15B, 50A, or 50B configuring each metal plate member 10A or 10B, which are opposed to the filter medium, to be flat, the porous support plate can be supported by the flat surface in a stable manner.

A manufacturing method of a retainer for filters according to a fourth aspect of the present invention is characterized by including a process of preparing two metal materials 80A and 80B or 85A and 85B in the form of flat plates, a process of forming a first metal plate member and a second metal plate member in areas (plate surfaces) of the respective metal materials by forming the slits 20A, 20B, 45A, or 45B having a predetermined shape in each metal material in parallel to each other to penetrate, a process of stacking one of the metal materials on the other metal material and preliminarily fixing the metal materials in such a manner that a back surface (one surface) of one of the metal plate members is positioned with respect to a back surface of the other metal plate member to have a predetermined positional relation, a process of integrating and fixing (sintering or the like) the crossings C of the flow-path forming members configuring both the metal plate members, and a process of cutting and removing excess portions of each metal material located in an inner circumferential edge and an outer circumferential edge of each metal plate member.

Since the two metal plate members have the same shape as each other, the number of processes required for processing of the metal materials can be reduced. Since the retainer is completed by positioning the two processed metal materials with respect to each other, then sintering the crossings of the flow-path forming members, and cutting and removing the excess portions of the metal materials, the total number of manufacturing processes can be largely reduced.

A manufacturing method of a retainer for filters according to a fifth aspect of the present invention is characterized by including a process of preparing two metal materials in the form of donut-shaped flat plates, a process of forming a first metal plate member and a second metal plate member in the areas (plate surfaces) of the respective metal materials by forming a plurality of slits having a predetermined shape in each metal material in parallel to each other to penetrate without opening both ends in the longitudinal direction of each slit, a process of stacking one of the metal materials on the other metal material and preliminarily fixing the metal materials in such a manner that one surface of one of the metal plate members is positioned with respect to one surface of the other metal plate member to have a predetermined positional relation, a process of integrating crossings of flow-path forming members configuring both the metal plate members, and a process of cutting and removing excess portions of each metal material located in an inner circumferential edge and an outer circumferential edge of each metal plate member.

The difference between the manufacturing methods of the fifth aspect of the present invention and the fourth aspect of the present invention is that the metal materials prepared in advance have a donut shape, and the metal materials have to be processed in advance to have the donut shape.

A manufacturing method of a retainer for filters according to a sixth aspect of the present invention is characterized in that any of the aforementioned retainers for filters 1 and 30 is manufactured by any one of a casting method, a manufacturing method using powder metallurgy, a manufacturing method using a 3D printer, and a manufacturing method using cutting.

That is, a manufacturing method can be employed, other than manufacturing of the retainer 1 by using two metal materials. Accordingly, the productivity can be improved, for example, by omitting a sintering process.

A leaf disc filter element according to a seventh aspect of the present invention is characterized by including the retainer for filters 1 or 30, the hub 104 fixed to a center opening of the retainer for filters, the porous support plates 106 respectively arranged on upper and lower outer surfaces of the retainer for filters, and the filter media 108 respectively arranged on outer side surfaces of the porous support plates.

By applying the retainer for filters 1 or 30 to a leaf disc filter element, effects of low pressure loss, high strength, and high pressure resistance can be obtained.

REFERENCE SIGNS LIST

1 retainer for filters, 10A first metal plate member, 10B second metal plate member, 15A, 15B flow-path forming member (rod member or wire rod), 20A, 20B slit, F1 to F9 flow path, 30 retainer for filters, 40A first metal plate member, 40B second metal plate member, 45A, 45B slit, 50A, 50B flow-path forming member (rod member or wire rod), 80A, 80B metal material, 85A, 85B metal material, 100 leaf disc filter element, 104 hub, 106 punching plate (porous support plate), 108 filter medium, 110 ring, 112 spacer.

The invention claimed is:

1. A retainer for filters comprising:

a first metal plate member in which a plurality of flow-path forming members having a predetermined curved shape or a linear shape in plan view are arranged on a same plane in parallel to each other with a predetermined interval to form a donut shape as a whole; and a second metal plate member having a configuration equivalent to that of the first metal plate member, wherein crossings of the flow-path forming members constituting the respective metal plate members are fixed while one surface of the second metal plate member is stacked on one surface of the first metal plate member, and the flow-path forming members constituting the first metal plate member and the flow-path forming members constituting the second metal plate member form a linear symmetric shape in plan view, wherein first flow-paths formed between each of flow-path forming members constituting the first metal plate member and second flow-paths formed between each of flow-path forming members constituting the second metal plate member form the first and second flow-paths which penetrate the retainer in a curved manner from an outermost circumferential edge to an innermost circumferential edge of the first metal plate member and second metal plate member of the retainer with no obstacles respectively for a flow resistance of a melted resin as opposed to third flow-paths and fourth flow-paths formed in a zigzag manner, or wherein fifth flow-paths formed between each of flow-path forming members constituting the first metal plate member and sixth flow-paths formed between each of flow-path forming members constituting the second metal plate member form the fifth and sixth flow-paths which penetrate the retainer in a straight manner from the outermost circumferential edge to the innermost circumferential edge of the first metal plate member and second metal plate member of the retainer with no obstacles respectively for the flow resistance of the melted resin as opposed to seventh flow-paths, eighth flow-paths and nineth flow-paths formed in the zigzag manner.

2. The retainer for filters according to claim 1, wherein the flow-path forming members having the predetermined curved shape in plan view are arranged in parallel to each other to form a spiral shape.

3. The retainer for filters according to claim 1, wherein a front surface and a back surface of each of the flow-path forming members are flat surfaces.

4. A leaf disc filter element comprising:

the retainer for filters according to claim 1;

a hub fixed to a center opening of the retainer for filters;

porous support plates respectively arranged on upper and lower outer surfaces of the retainer for filters; and filter media respectively arranged on outer side surfaces of the porous support plates.

\* \* \* \* \*